United States Patent
Sato et al.

(10) Patent No.: US 6,589,690 B1
(45) Date of Patent: Jul. 8, 2003

(54) SECONDARY BATTERY

(75) Inventors: Asako Sato, Yokohama (JP); Takashi Kuboki, Tokyo (JP); Shuji Yamada, Yokohama (JP); Hiroyuki Hasebe, Chigasaki (JP); Norio Takami, Yokohama (JP); Takahisa Ohsaki, Yokohama (JP); Motoya Kanda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/536,685

(22) Filed: Mar. 28, 2000

(30) Foreign Application Priority Data

Mar. 30, 1999 (JP) .......................... 11-089173
Mar. 30, 1999 (JP) .......................... 11-089175

(51) Int. Cl.$^7$ .................... H01H 69/02; H01M 6/00; H01M 4/58

(52) U.S. Cl. .................. 429/162; 429/160; 429/164; 429/231.8; 429/231.95; 29/623.1; 29/623.3; 29/623.5

(58) Field of Search ............... 429/162, 160–164, 429/231.8, 231.95; 29/623.1–623.5

(56) References Cited

U.S. PATENT DOCUMENTS

| | | | | |
|---|---|---|---|---|
| 3,607,401 A | * | 9/1971 | Halpert et al. ............... 136/6 |
| 4,505,996 A | * | 3/1985 | Simonton ................... 429/154 |
| 4,664,994 A | | 5/1987 | Koike et al. |
| 4,678,725 A | * | 7/1987 | Kikuchi et al. ............... 429/53 |
| 5,368,953 A | * | 11/1994 | Zaborney et al. ............. 429/90 |
| 5,437,692 A | | 8/1995 | Dasgupta et al. |
| 5,538,814 A | * | 7/1996 | Kamauchi et al. ........... 429/218 |
| 5,952,121 A | * | 9/1999 | Blonsky et al. ............. 429/162 |
| 6,010,806 A | * | 1/2000 | Yokoyama et al. ......... 429/330 |
| 6,024,773 A | * | 2/2000 | Inuzuka et al. ............. 29/623.4 |
| 6,051,342 A | * | 4/2000 | Hamano et al. ............ 29/623.4 |
| 6,153,338 A | * | 11/2000 | Gan et al. ................... 429/326 |
| 6,162,871 A | * | 12/2000 | Watanabe et al. ........... 525/240 |
| 6,187,472 B1 | * | 2/2001 | Shiota et al. ................ 429/127 |
| 6,265,103 B1 | * | 7/2001 | Shacklett et al. ........... 429/167 |
| 6,277,516 B1 | * | 8/2001 | Sasaki et al. ............... 29/623.2 |
| 6,291,106 B1 | * | 9/2001 | Daido et al. ............. 429/231.8 |
| 6,406,817 B2 | * | 6/2002 | Wariishi et al. ............. 429/314 |
| 6,413,667 B1 | * | 7/2002 | Gozdz ......................... 429/144 |
| 6,423,447 B1 | * | 7/2002 | Ohsaki et al. ................. 215/47 |

FOREIGN PATENT DOCUMENTS

| | | | | |
|---|---|---|---|---|
| EP | 1043782 A2 | * | 10/2000 | ................. 429/162 |
| JP | 5-343095 | * | 12/1993 | ................. 429/162 |
| JP | 10-172606 | | 6/1998 | |
| JP | 10-177865 | | 6/1998 | |
| JP | 10-189054 | | 7/1998 | |

* cited by examiner

Primary Examiner—M. Alexandra Elve
Assistant Examiner—L. Edmondson
(74) Attorney, Agent, or Firm—Oblon, Spivak, McClelland, Maier & Neustadt, P.C.

(57) ABSTRACT

There is provided a secondary battery comprising an electrode group comprising a positive electrode, a negative electrode having a negative electrode collector and a negative electrode layer held to the collector, and a separator interposed between the positive electrode and the negative electrode layer, a nonaqueous electrolyte held by the electrode group, and a jacket housing the electrode group and having a thickness of not more than 0.3 mm, wherein the positive electrode, the negative electrode and the separator are formed integral, and the peeling strength between the negative electrode layer and the separator is lower than the peeling strength between the negative electrode layer and the negative electrode collector.

40 Claims, 5 Drawing Sheets

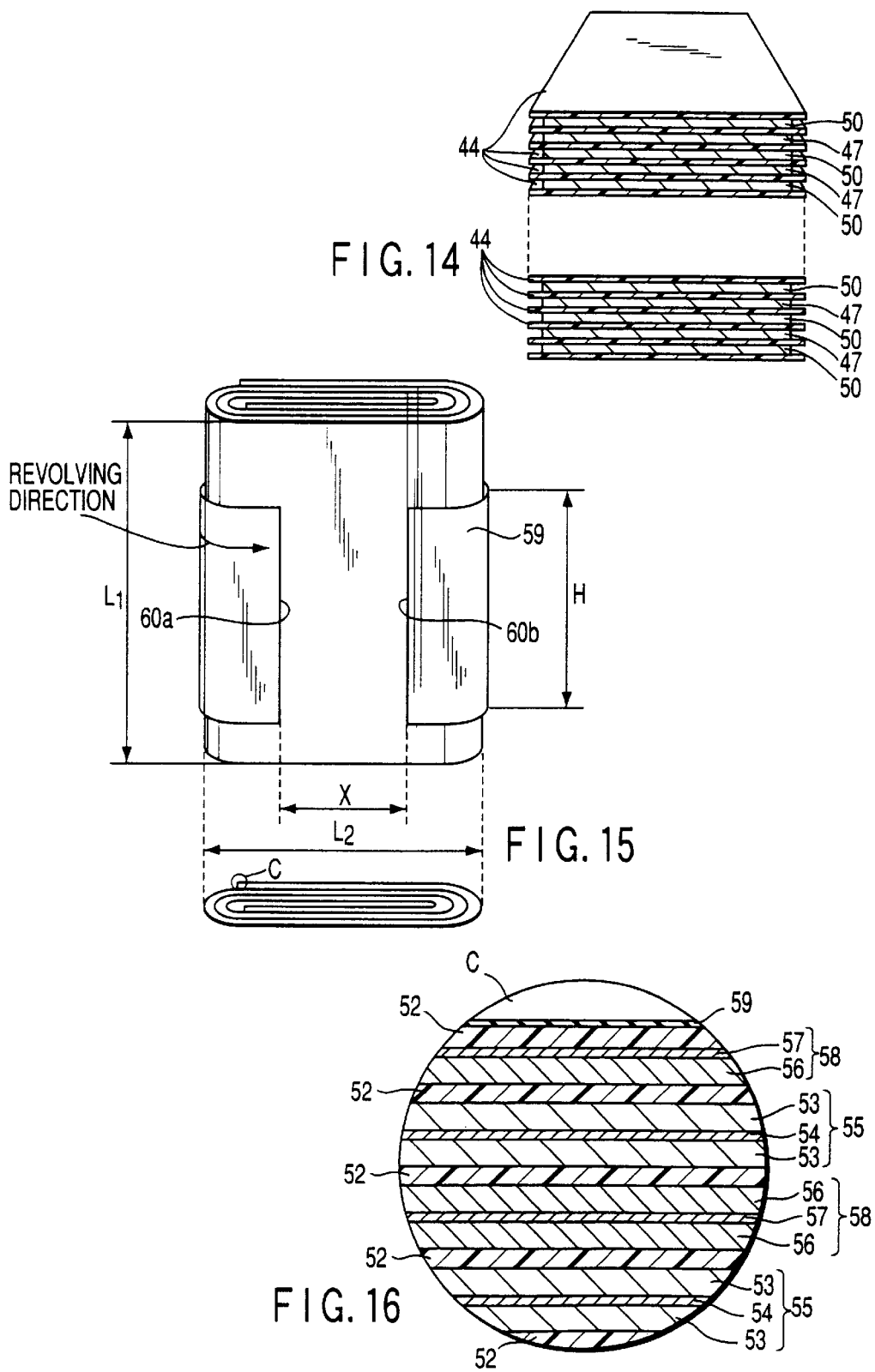

SECONDARY BATTERY

CROSS-REFERENCE TO RELATED APPLICATIONS

This application is based upon and claims the benefit of priority from the prior Japanese Patent Applications No. 11-089173, filed Mar. 30, 1999; and No. 11-089175, filed Mar. 30, 1999, the entire contents of which are incorporated herein by reference.

BACKGROUND OF THE INVENTION

This invention relates to a nonaqueous electrolyte secondary battery.

At present, a thin lithium ion secondary battery is commercialized as a nonaqueous electrolyte secondary battery which is adapted to be used in a portable equipment such as a portable telephone. This battery comprises a positive electrode containing lithium cobalt oxide ($LiCoO_2$), a negative electrode containing a graphite material or carbonaceous material, a liquid nonaqueous electrolyte comprising an organic solvent containing a lithium salt dissolved therein, a separator consisting of a porous film, and a jacket consisting of a cylindrical or rectangular metallic can.

Although it is now desired to make the battery thinner or lighter in conformity with an increasing trend for the miniaturization and thinning of a portable equipment, it has been difficult to realize a thin lithium ion secondary battery provided with the aforementioned liquid nonaqueous electrolyte and a metallic can and having a thickness of not more than 4 mm.

Meanwhile, another type of lithium ion secondary battery has been proposed and studied for further development thereof, this lithium ion secondary battery comprising an electrode group consisting of a positive electrode, a negative electrode, and a polymer electrolyte layer interposed between the positive electrode and the negative electrode, an electrolyte consisting of a polymer electrolyte, and a jacket for housing the aforementioned electrode group. It is possible, in the case of this secondary battery, to ensure the adherence of the positive and negative electrodes to the polymer electrolyte layer even if the thickness of the jacket is reduced. As a result, it is possible to employ a laminate film consisting of a thin metallic layer and a polymer film as a material for the jacket. The polymer electrolyte is composed of a gel-like polymer in which a nonaqueous electrolyte is held.

This secondary battery however is accompanied with a problem that since this secondary battery is relatively large impedance at the interface of electrode and relatively low in lithium ionic conductivity as compared with the aforementioned lithium ion secondary battery provided with a liquid nonaqueous electrolyte, this secondary battery is poor in volume energy density as well as in large discharge characteristic as compared with the aforementioned lithium ion secondary battery provided with a liquid nonaqueous electrolyte.

In view of the aforementioned circumstances, the following proposals have been made so far for thinning the lithium ion secondary battery provided with a liquid nonaqueous electrolyte.

For example, Japanese Patent Disclosure (Kokai) H10-177865 discloses a lithium ion secondary battery including a positive electrode, a negative electrode, a separator having opposed surfaces holding an electrolyte, and an adhesive resin layer which is made from a mixed phase of an electrolyte phase, a polymer gel phase containing an electrolyte, and a polymer solid phase and adheres the positive and negative electrodes to the opposing surfaces of the separator.

Further, Japanese Patent Disclosure (Kokai) H10-189054 discloses in the claims thereof a method of manufacturing a lithium ion secondary battery comprising the steps of; coating a separator with a binder resin solution prepared by dissolving polyvinylidene fluoride as a main component in a solvent, putting an electrode on this separator and drying these materials, as they are adhered to each other, to evaporate the solvent and thereby form a battery stacked body, and impregnating this battery stacked body with an electrolyte. Furthermore, Japanese Patent Disclosure (Kokai) H10-172606 discloses in the claims thereof a lithium ion secondary battery including a positive electrode, a negative electrode, a separator interposed between the positive electrode and the negative electrode and holding an electrolyte containing lithium ion, and a porous adhesive resin layer holding the electrolyte and adhering the positive electrode, the negative electrode and the separator. The secondary battery disclosed in Japanese Patent Disclosure (Kokai) H10-172606 is constructed such that the bonding strength between the layer of positive electrode and the separator is the same with or higher than the bonding strength between the layer of positive electrode and the positive electrode collector, and that the bonding strength between the layer of negative electrode and the separator is the same with or higher than the bonding strength between the layer of negative electrode and the negative electrode collector.

However, these lithium ion secondary batteries disclosed in these publications are all accompanied with the problem that since the internal impedance thereof tends to become higher, thereby deteriorating the charge/discharge cycle life (which may be referred to hereinafter as cycle life).

BRIEF SUMMARY OF THE INVENTION

Accordingly, an object of the present invention is to provide a secondary battery which includes a light-weight and thin jacket and is excellent in cycle life.

Another object of this invention is to provide a secondary battery exhibiting an enhanced thermal stability and an improved safety.

A further object of this invention is to provide a secondary battery which includes a light-weight and thin jacket and is excellent in resistance against an external shock.

Namely, according to the present invention, there is provided a secondary battery comprising an electrode group comprising a positive electrode, a negative electrode having a negative electrode collector and a negative electrode layer held to the collector, and a separator interposed between the positive electrode and the negative electrode layer; a non-aqueous electrolyte held by the electrode group; and a jacket housing the electrode group and having a thickness of not more than 0.3 mm, wherein the positive electrode, the negative electrode and the separator are formed integral, and the peeling strength between the negative electrode layer and the separator is lower than the peeling strength between the negative electrode layer and the negative electrode collector.

According to the present invention, there is also provided a secondary battery comprising an electrode group comprising a positive electrode having a positive electrode collector and a positive electrode layer held to the positive electrode collector, a negative electrode having a negative electrode collector and a negative electrode layer held to the negative electrode collector, and a separator interposed between the positive electrode layer and the negative electrode layer; a nonaqueous electrolyte held by the electrode group; and a jacket housing the electrode group and having a thickness of not more than 0.3 mm, wherein the positive electrode, the negative electrode and the separator are formed integral, and the peeling strength between the positive electrode layer and the separator is lower than the peeling strength between the positive electrode layer and the positive electrode collector, while the peeling strength between the negative electrode layer and the separator is lower than the peeling strength between the negative electrode layer and the negative electrode collector.

According to the present invention, there is also provided a secondary battery comprising an electrode group comprising a positive electrode, a negative electrode having a negative electrode collector and a negative electrode layer held to the negative electrode collector, and a separator interposed between the positive electrode and the negative electrode layer; a nonaqueous electrolyte held in the electrode group; and a jacket housing the electrode group and having a thickness of not more than 0.3 mm, wherein the positive electrode, the negative electrode and the separator are formed integral; the peeling strength between the negative electrode layer and the separator is lower than the peeling strength between the negative electrode layer and the negative electrode collector; the nonaqueous electrolyte contains a solution prepared by dissolving a solute in a nonaqueous solvent, the solution having a viscosity of 3 cp to 20 cp at a temperature of 20° C.

According to the present invention, there is also provided a secondary battery comprising an electrode group comprising a positive electrode having a positive electrode collector and a positive electrode layer held to the positive electrode collector, a negative electrode having a negative electrode collector and a negative electrode layer held to the negative electrode collector, and a separator interposed between the positive electrode layer and the negative electrode layer; a nonaqueous electrolyte held in the electrode group; and a jacket housing the electrode group and having a thickness of not more than 0.3 mm, wherein the positive electrode, the negative electrode and the separator are formed integral, the peeling strength between the positive electrode layer and the separator is lower than the peeling strength between the positive electrode layer and positive electrode collector, while the peeling strength between the negative electrode layer and the separator is lower than the peeling strength between the negative electrode layer and the negative electrode collector; the nonaqueous electrolyte contains a solution prepared by dissolving a solute in a nonaqueous solvent, the solution having a viscosity of 3 cp to 20 cp at a temperature of 20° C.

According to the present invention, there is further provided a secondary battery comprising an electrode group comprising a positive electrode, a negative electrode having a negative electrode collector and a negative electrode layer held to the collector, and a separator interposed between the positive electrode and the negative electrode layer; a nonaqueous electrolyte held by the electrode group; and a jacket housing the electrode group, the jacket being made of a sheet having d thickness of not more than 0.5 mm and including a resin layer, wherein the positive electrode, the negative electrode and the separator are formed integral, and the peeling strength between the negative electrode layer and the separator is lower than the peeling strength between the negative electrode layer and the negative electrode collector.

According to the present invention, there is also provided a secondary battery comprising an electrode group comprising a positive electrode, a negative electrode having a negative electrode collector and a negative electrode layer held to the negative electrode collector, and a separator interposed between the positive electrode and the negative electrode layer; a nonaqueous electrolyte held in the electrode group; and a jacket housing the electrode group, the jacket being made of a sheet having a thickness of not more than 0.5 mm and including a resin layer, wherein the positive electrode, the negative electrode and the separator are formed integral; the peeling strength between the negative electrode layer and the separator is lower than the peeling strength between the negative electrode layer and the negative electrode collector; the nonaqueous electrolyte contains a solution prepared by dissolving a solute in a nonaqueous solvent, the solution having a viscosity of 3 cp to 20 cp at a temperature of 20° C.

According to the present invention, there is further provided a secondary battery comprising an electrode group of flattened configuration which comprises a positive electrode having a positive electrode collector and a positive electrode layer held to the positive electrode collector, a negative electrode, and a separator interposed between the positive electrode and the negative electrode; a liquid nonaqueous electrolyte impregnated in the electrode group; and a jacket housing the electrode group and having a thickness of not more than 0.3 mm, wherein the electrode group has a couple of maximum areas, at least one of which is occupied by the positive electrode collector.

According to the present invention, there is further provided a secondary battery comprising an electrode group of flattened configuration which comprises a positive electrode having a positive electrode collector and a positive electrode layer held to the positive electrode collector, a negative electrode, and a separator interposed between the positive electrode and the negative electrode; a liquid nonaqueous electrolyte impregnated in the electrode group; and a jacket housing the electrode group, the jacket being made of a sheet having a thickness of not more than 0.5 mm and including a resin layer, wherein the electrode group has a couple of maximum areas, at least one of which is occupied by the positive electrode collector.

According to the present invention, there is further provided a secondary battery comprising an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group and having a thickness of not more than 0.3 mm, wherein the electrode group has a couple of maximum areas, each area is occupied by the separator.

According to the present invention, there is further provided a secondary battery comprising an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group, the jacket being made of a sheet having a thickness of not more than 0.5 mm and including a resin layer, wherein the electrode group has a couple of maximum areas, each area is occupied by the separator.

According to the present invention, there is further provided a secondary battery comprising an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group and having a thickness of not more than 0.3 mm, wherein the electrode group has a couple of maximum areas, and an insulating protective sheet is disposed to bridge the couple of maximum areas.

According to the present invention, there is further provided a secondary battery comprising an electrode group of flattened configuration which comprises a positive electrode, a negative electrode, and a separator interposed between the positive electrode and the negative electrode; a liquid. nonaqueous electrolyte impregnated in the electrode group; and a jacket housing the electrode group, the jacket being made of a sheet having a thickness of not more than 0.5 mm and including a resin layer, wherein the electrode group has a couple of maximum areas, and an insulating protective sheet is disposed to bridge the couple of maximum areas.

The flattened configuration of the electrode group is preferably the one which can be obtained by spirally winding the positive electrode and the negative electrode with the separator being interposed therebetween and compressing the spiral in the direction of the diameter; the one which can be obtained by folding a laminate composed of the positive electrode, the negative electrode and the separator once or a plurality times; or the one which can be obtained by laminating the positive electrode, the negative electrode and the separator. Also, the flattened configuration of the electrode group is preferably the one which can be obtained by spirally winding the positive electrode and the negative electrode with the separator being interposed therebetween in a flattened shape.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a perspective view illustrating another example of the electrode group to be incorporated in the third nonaqueous electrolyte secondary battery according to this invention;

FIG. 15 is a schematical view illustrating one example of the electrode group to be incorporated in a fourth nonaqueous electrolyte secondary battery according to this invention; and FIG. 16 is an enlarged cross-sectional view showing the portion C shown in FIG. 15.

DETAILED DESCRIPTION OF THE INVENTION

Figure 1:
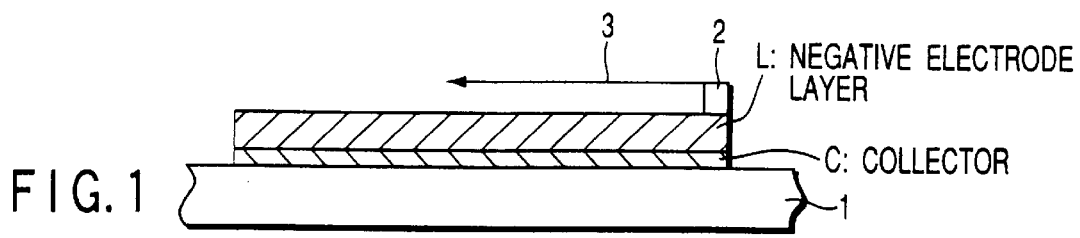
FIG. 1 is a schematical view illustrating a peeling test at pulling angle of 180 degree.

Next, a first, second, third and fourth nonaqueous electrolyte secondary batteries according to this invention will be explained in detail as follows.

The first nonaqueous electrolyte secondary battery according to this invention comprises an electrode group comprising a positive electrode, a negative electrode having a negative electrode collector and a negative electrode layer held to the collector, and a separator interposed between the positive electrode and the negative electrode layer;

a nonaqueous electrolyte held by the electrode group; and a jacket A housing said electrode group and having a thickness of not more than 0.3 mm, or a jacket B housing said electrode group, the jacket B being made of a sheet having a thickness of not more than 0.5 mm and including a resin layer.

In this secondary battery, these positive electrode, negative electrode and separator are formed integral with each other. Further, the peeling strength between the negative electrode layer and the separator is lower than the peeling strength between the negative electrode layer and the negative electrode collector.

Followings are explanation on these positive electrode, negative electrode, separator, nonaqueous electrolyte and jacket.

(1) Negative Electrode

This negative electrode comprises a negative electrode collector, and a negative electrode layer containing a negative electrode material and a binder, and carried by one surface or both surfaces of the negative electrode collector.

As for the negative electrode material, a carbon material which is capable of absorbing and desorbing lithium ion can be preferably employed. As for the carbon material, it is possible to employ a graphitized material and carbonaceous material such as graphite, coke, carbon fiber, spherical carbon and granular carbon; or a graphitized material and carbonaceous material obtained by heat-treating a thermosetting resin, isotropic pitch, mesophase pitch, mesophase pitch-based carbon fibers, vapor-grown carbon fiber and mesophase globules at a temperature of 500 to 3,000° C. Preferred carbon materials obtained by heat treatment include a graphitized material or a carbonaceous material of a mesophase pitch-based carbon fiber, a graphitized material or a carbonaceous material of mesophase globules, and a granular graphitized material. Among the carbon materials, the carbon material "a" and carbon material "b" are particularly preferable.

The carbon material "a" is a graphitized material having a graphite crystal where the interplanar spacing $d_{002}$ derived from (002) reflection is 0.340 nm or less, which can be obtained by setting the heat treatment temperature to 2,000° C. or more. It is desirable for the graphitized material to be granular. A nonaqueous electrolyte secondary battery including a negative electrode containing the carbon material "a" is capable of greatly improving the cell capacity and large current characteristic. More preferably, the interplanar spacing $d_{002}$ should be 0.336 nm or less.

The carbon material "b" is a graphitized material which can be obtained by setting the heat treatment temperature to 2,000° C. or more. It is desirable for the graphitized material to be fibrous or spherical. Also, it is possible to use a mixture of a fibrous graphitized material and a spherical graphitized material. Particularly, it is desirable to use a graphitized material of a mesophase pitch-based carbon fiber, a vapor-grown carbon fiber such as a carbon whisker and a graphitized material of mesophase globules. Since a negative electrode containing this carbon material "b" is capable of minimizing an interface impedance between the negative electrode and the separator even if the density thereof is increased to 1.3 g/cm³ or more, it is possible to improve the large discharge characteristic and rapid charge/discharge cycle property of the secondary battery.

The carbon material may be fibrous, spherical or granular. Where the negative electrode layer contains at least one kind of carbon material selected from the group consisting of a fibrous carbon material, a spherical carbon material and a granular carbon material, the interface impedance of the negative electrode can be kept at a low value over a long period of time, leading to an improved charge-discharge cycle life.

An average fiber length of the fibrous carbon material should desirably fall within a range of between 5 μm and 200 μm, more preferably, between 10 μm and 50 μm.

An average fiber diameter of the fibrous carbon material should desirably fall within a range of between 0.1 μm and 20 μm, more preferably, between 1 μm and 15 μm.

An average aspect ratio of the fibrous carbon material should desirably fall within a range of between 1.5 and 200, more preferably, between 1.5 and 50. Incidentally, the aspect ratio is a ratio of the length to the diameter of the fiber (length/diameter).

An average particle size of the spherical carbon material should desirably fall within a range of between 1 μm and 100 μm, more preferably, between 2 μm and 40 μm.

A ratio of the minor radius to the major radius (minor radius/major radius) of the spherical carbon material should desirably fall within a range of 1/10 or more. More preferably, the ratio should fall within a range 1/2 or more.

The granular carbon material represents a carbon powder having a ratio of the minor radius to the major radius (minor radius/major radius), which falls within a range of between 1/100 and 1. More preferably, the ratio should fall within a range of between 1/10 and 1.

An average particle size of the granular carbon material should desirably fall within a range of between 1 μm and 100 μm, more preferably, between 2 μm and 50 μm.

The binder functions not only to bond the negative materials with each other but also to bond the negative material with the negative electrode collector. As for this binder, it is possible to employ polytetrafluoroethylene (PTFE), polyvinylidene fluoride (PVdF), ethylene-propylene-diene copolymer (EPDM), styrene-butadiene rubber (SBR), carboxymethylcellulose (CMC), etc. If it is desired to form the positive and negative electrodes and the separator into an integral body by means of a heat-molding method to be explained below, it is preferable to employ as a binder a thermosetting resin, most preferably PVdF.

The mixing ratios of these carbon material and binder should preferably be 90 to 98% by weight for the carbon material and 2 to 20% by weight for the binder. In particular, the content of the carbon material in the negative electrode should preferably be in the range of 10 to 80 g/cm² as measured on one surface thereof. Further, the packing density should preferably be in the range of 1.2 to 1.50 g/cm³.

The thickness of the negative electrode layer should preferably be in the range of 10 to 150 μm. The thickness of the negative electrode layer herein means a distance between the surface of negative electrode layer which faces the separator and the surface of negative electrode layer which is contacted with the collector. Where negative electrode layers are formed on both surfaces of the negative electrode collector, one negative electrode layer has a thickness of 10 to 150 μm. Naturally, the total thickness of the two negative electrode layers formed on both surfaces of the collector is 20 to 300 μm. A more preferable range of the thickness of the negative electrode layer should be set to the range of 30 to 100 μm. When the thickness of the negative electrode layer is controlled within the range of 30 to 100 μm, it is possible to greatly improve the large discharge characteristic and charge/discharge cycle life of the secondary battery.

As for the collector, it is possible to employ a conductive substrate of porous structure or a non-porous conductive substrate. These conductive substrate can be made from copper, stainless steel or nickel.

The thickness of the collector should preferably be in the range of 5 to 20 μm. Because if the thickness of the collector is confined within this range, it is possible to ensure a sufficiently high mechanical strength of the negative electrode while properly suppressing the weight of the negative electrode.

The peeling strength between the negative electrode layer and the negative electrode collector, as well as the peeling strength between the negative electrode layer and the separator can be measured by means of a peeling test at pulling angle of 180 degree.

Figure 2:
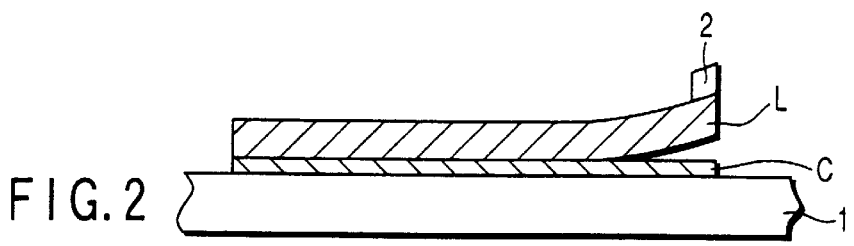
FIG. 2 is a schematical view illustrating a peeling test at pulling angle of 180 degree.

The principle for measuring the peeling strength between the negative electrode layer and the negative electrode collector by means of the peeling test will be explained with reference to FIGS. 1 and 2.

First of all, a nonaqueous electrolyte secondary battery is disintegrated to take out a laminate body comprising a negative electrode layer L which is carried by the surface of a negative electrode collector C. This laminate body may be kept in a state where a nonaqueous electrolyte is held therein. This laminate body is placed on a support plate 1 with the collector side thereof being turned downward.

Then, a fixed point 2 is set on the surface of the negative electrode layer L. Thereafter, a traction member 3 such as a string is attached to this fixed point 2. This traction member 3 is then pulled in a direction indicated by the arrow shown in FIG. 1, i.e. in a direction parallel with the surface of the negative electrode layer L, thereby the negative electrode layer L is peeled from the negative electrode collector C as shown in FIG. 2.

The pulling force is changed during peeling of the negative electrode layer, reaching a constant pulling force at a certain point of peeling of the negative electrode layer from the laminate body. The peeling strength between the negative electrode layer and the negative electrode collector was determined by the constant pulling force.

On the other hand, the principle of measurement of the peeling strength between the negative electrode layer and the separator by means of the peeling test will be explained as follows.

First of all, a nonaqueous electrolyte secondary battery is disintegrated to take out a laminate body comprising a negative electrode collector, a negative electrode layer and a separator, which are laminated in the mentioned order. This laminate body may be kept in a state where a nonaqueous electrolyte is held therein. This laminate body is placed on a support plate with the collector side thereof being turned downward.

Then, a fixed point is set on the surface of the separator. This traction member is then pulled in a direction parallel with the surface of the separator, thereby the separator is peeled from the negative electrode layer.

The pulling force is changed during peeling of the separator, reaching a constant pulling force at a certain point of peeling of the separator from the laminate body. The peeling strength between the separator and the negative electrode layer was determined by the constant pulling force.

It has been found that where an electrode group that has been taken Out through the disintegration of the secondary battery indicates a lower peeling strength between the negative electrode layer and the separator as compared with the peeling strength between the negative electrode layer and the negative electrode collector, this relationship in peeling strength can be applied to an electrode group which is not yet placed in the secondary battery and hence, does not yet hold a nonaqueous electrolyte, i.e. the peeling strength between the negative electrode layer and the separator as measured by means of the peeling test at pulling angle of 180 degree is lower than the peeling strength between the negative electrode layer and the negative electrode collector as measured by means of the peeling test at pulling angle of 180 degree.

The peeling strength between the negative electrode layer and the negative electrode collector should preferably be in the range of 10 gf/cm to 20 gf/cm. When this peeling strength is controlled within this range, it is possible to inhibit the negative electrode layer from being peeled from the negative electrode collector that might have been resulted due to the repetition of charge/discharge cycle of the secondary battery, thereby making it possible to further improve the charge/discharge cycle life of the secondary battery.

The peeling strength between the negative electrode layer and the separator should preferably be not more than 10 gf/cm. Because if the peeling strength between the negative electrode layer and the separator exceeds over 10 gf/cm, the interface impedance between the negative electrode and the separator would become larger, thereby making it difficult to obtain an excellent large discharge characteristic and charge/discharge cycle life of the secondary battery. This peeling strength should more preferably be not more than 5 gf/cm, most preferably not more than 2 gf/cm. By the way, when the negative electrode is not integrated with the separator, the peeling strength thereof would be 0 gf/cm.

As for the materials for the negative electrode, it is possible to employ, other than the carbon material which is capable of absorbing and desorbing lithium ion, a metal oxide, a metal sulfide, a metal nitride, lithium metal or a lithium alloy.

As for the materials for the metal oxide, it is possible to employ a tin oxide, a silicon oxide, a lithium titanium oxide, niobium oxide, a tungsten oxide, etc.

As for the materials for the metal sulfide, it is possible to employ tin sulfide, titanium sulfide, etc.

As for the materials for the metal nitride, it is possible to employ lithium cobalt nitride, lithium iron nitride, lithium manganese nitride, etc.

As for the materials for the lithium alloy, it is possible to employ a lithium aluminum alloy, a lithium tin alloy, a lithium lead alloy, a lithium silicon alloy, etc.

The surface area of the negative electrode should preferably be larger than that of the positive electrode. When the negative and positive electrodes are constructed in this manner, the end portion of the negative electrode can be extended further as compared with the end portion of the positive electrode, thereby making it possible to alleviate a current concentration to the end portion of the negative electrode and to improve the charge/discharge property and safety of the secondary battery.

(2) Positive Electrode

This positive electrode comprises a positive electrode collector, and a positive electrode layer containing an active material and a binder, and carried by one surface or both surfaces of the positive electrode collector.

As for the active material for positive electrode, it is possible to employ various kinds of oxide such as manganese dioxide, lithium manganese composite oxide, lithium-containing nickel oxide, lithium-containing cobalt oxide, lithium-containing nickel cobalt oxide, lithium-containing iron oxide and lithium-containing vanadium oxide; or a chalcogen compound such as titanium disulfide, molybdenum disulfide, etc. Among them, lithium-containing cobalt oxide (for example, $LiCoO_2$), lithium-containing nickel cobalt oxide (for example, $LiNi_{0.8}Co_{0.2}O_2$) and lithium manganese composite oxide (for example, $LiMn_2O_4$, $LiMnO_2$) are preferable for obtaining a high voltage.

The binder functions not only to bond the active materials with each other but also to bond the active material with the positive electrode collector. As for this binder, it is possible to employ polytetrafluoroethylene (PTFE), polyvinylidene fluoride (PVdF), ethylene-propylene-diene copolymer (EPDM), styrene-butadiene rubber (SBR), etc. If it is desired to form the positive and negative electrodes and the separator into an integral body by means of a heat-molding method to be explained below, it is preferable to employ as a binder a thermosetting resin, most preferably PVdF.

This positive electrode layer may additionally contain a conductive agent such as acetylene black, carbon black, graphite, etc.

The mixing ratios of these active material for positive electrode, conductive agent and binder should preferably be 80 to 95% by weight for the active material for positive electrode, 3 to 20% by weight for the conductive material, and 2 to 7% by weight for the binder.

The thickness of the positive electrode layer should preferably be in the range of 10 to 150 μm. The thickness of the positive electrode layer herein means a distance between the surface of positive electrode layer which faces the separator and the surface of positive electrode layer which is contacted with the collector. Where positive electrode layers are formed on both surfaces of the positive electrode collector, one positive electrode layer has a thickness of 10 to 150 μm. Naturally, and the total thickness of the two positive electrode layers formed on both surfaces of the collector is 20 to 300 μm. A more preferable range of the thickness of the positive electrode layer should be set to the range of 30 to 100 μm. When the thickness of the positive electrode layer is controlled within the range of 30 to 100 μm, it is possible to greatly improve the large discharge characteristic and charge/discharge cycle life of the secondary battery.

A porous conductive substrate or a non-porous conductive substrate can be used as the collector. It is possible to use, for example, aluminum, stainless steel or nickel for forming the conductive substrate. The thickness of the collector should desirably be set to fall within a range of between 5 and 20 μm. If the thickness falls within the particular range, it is possible to increase the mechanical strength of the positive electrode while suppressing an increase in the weight of the positive electrode.

As this collector, it is particularly preferable to use a conductive substrate having a two-dimensional porous structure in which pores 3 mm or less in diameter exist at a ratio of one or more pores per 10 cm$^2$. That is, if the diameter of the pores formed in the conductive substrate is larger than 3 mm, no satisfactory positive electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm$^2$.

The conductive substrate having a two-dimensional porous structure in which pores 3 mm or less in diameter exist at a ratio of one or more pores per 10 cm$^2$ preferably has a thickness of 15 to 100 μm. If the thickness is less than 15 μm, no satisfactory positive electrode strength may be obtained. If the thickness exceeds 100 μm, the battery weight and the electrode group thickness increase. This may make it difficult to well increase the weight energy density and volume energy density of the thin secondary battery. A more favorable range of the thickness is 30 to 80 μm.

The peeling strength between the positive electrode layer and the separator should preferably be lower than the peeling strength between the positive electrode layer and the positive electrode collector. If the peeling strength between the positive electrode layer and the separator is the same with or higher than the peeling strength between the positive electrode layer and the positive electrode collector, the interface impedance between the positive electrode and the separator would be increased, thus possibly making it impossible to realize the excellent cycle life and large discharge characteristic of the secondary battery.

The peeling strength between the positive electrode layer and the positive electrode collector, as well as the peeling strength between the positive electrode layer and the separator can be measured by means of a peeling test at pulling angle of 180 degree.

The principle for measuring the peeling strength between the positive electrode layer and the positive electrode collector by means of the peeling test will be explained as follows.

First of all, a nonaqueous electrolyte secondary battery is disintegrated to take out a laminate body comprising a positive electrode layer which is carried by the surface of a positive electrode collector. This laminate body may be kept in a state where a nonaqueous electrolyte is held therein. This laminate body is placed on a support plate with the collector side thereof being turned downward.

Then, a fixed point is set on the surface of the positive electrode layer. Thereafter, a traction member such as a string is attached to this fixed point. This traction member is then pulled in a direction parallel with the surface of the positive electrode layer, thereby the positive electrode layer is peeled from the positive electrode collector. The pulling force is changed during peeling of the positive electrode layer, reaching a constant pulling force at a certain point of peeling of the positive electrode layer from the laminate body. The peeling strength between the positive electrode layer and the positive electrode collector was determined by the constant pulling force.

On the other hand, the principal of the measurement of the peeling strength between the positive electrode layer and the separator by means of the peeling test will be explained as follows.

First of all, a nonaqueous electrolyte secondary battery is disintegrated to take out a laminate body comprising a positive electrode collector, a positive electrode layer and a separator, which are laminated in the mentioned order.

This laminate body may be kept in a state where a nonaqueous electrolyte is held therein. This laminate body is placed on a support plate with the collector side thereof being turned downward. Then, a fixed point is set on the surface of the separator.

Thereafter, a traction member is attached to this fixed point. This traction member is then pulled in a direction parallel with the surface of the separator, thereby the separator is peeled from the positive electrode layer.

The pulling force is changed during peeling of the separator, reaching a constant pulling force at a certain point of peeling of the separator from the laminate body. The peeling strength between the separator and the positive electrode layer was determined by the constant pulling force.

It has been found that where an electrode group that has been taken out through the disintegration of the secondary battery indicates a lower peeling strength between the positive electrode layer and the separator as compared with the peeling strength between the positive electrode layer and the positive electrode collector, this relationship in peeling strength can be applied to an electrode group which is not yet placed in the secondary battery and-hence, does not yet hold a nonaqueous electrolyte, i.e. the peeling strength between the positive electrode layer and the separator as measured by means of the peeling test at pulling angle of 180 degree is lower than the peeling strength between the positive electrode layer and the positive electrode collector as measured by means of the peeling test at pulling angle of 180 degree.

The peeling strength between the positive electrode layer and the positive electrode collector should preferably be in the range of 10 gf/cm to 20 gf/cm. When this peeling strength is controlled within this range, it is possible to inhibit the positive electrode layer from being peeled from the positive electrode collector that might have been resulted due to the repetition of charge/discharge cycle of the secondary battery, thereby making it possible to further improve the charge/discharge cycle life of the secondary battery.

The peeling strength between the positive electrode layer and the separator should preferably be not more than 10 gf/cm. Because if the peeling strength between the positive electrode layer and the separator exceeds over 10 gf/cm, the interface impedance between the positive electrode and the separator would become larger, thereby making it difficult to obtain an excellent large discharge characteristic and charge/discharge cycle life of the secondary battery. This peeling strength should more preferably be not more than 5 gf/cm, most preferably not more than 2 gf/cm. By the way, when the positive electrode is not integrated with the separator, the peeling strength thereof would be 0 gf/cm.

(3) Separator

The separator should be formed of a porous separator.

It is possible to use, for example, a porous film or an unwoven fabric as the porous sheet providing the separator used in the present invention. It is desirable for the porous sheet to be made of at least one material selected from the group consisting of polyolefin, cellulose and polyvinylidene fluoride (PVdF). The polyolefin includes, for example, polyethylene and polypropylene. It is desirable to use a porous film containing polyethylene or polypropylene. Particularly, a porous film made of polyethylene, polypropylene or both polyethylene and polypropylene permits improving the safety of the secondary battery and, thus, is desirable.

The thickness of the porous sheet is preferably 30 $\mu$m or less. If the thickness exceeds 30 $\mu$m, the distance between the positive and negative electrodes increases, and this may increase the internal resistance. The lower limit of the thickness is preferably 5 $\mu$m. If the thickness is less than 5 $\mu$m, the separator strength may significantly lower to allow easy internal short circuit. The upper limit of the thickness is more preferably 25 $\mu$m, and its lower limit is more preferably 10 $\mu$m.

It is desirable for the separator to exhibit an air permeability not higher than 500 seconds/100 cm$^3$. The air permeability represents the time (seconds) required for an air of 100 cm$^3$ to pass through the separator. If the air permeability exceeds 500 seconds/100 cm$^3$, it may be difficult for the separator to obtain a high lithium ion mobility. Also, the lower limit of the air permeability should desirably be 30 seconds/100 cm$^3$. If the air permeability is lower than 30 seconds/100 cm$^3$, it may be difficult to obtain a sufficient mechanical strength of the separator. Preferably, the upper limit of the air permeability should be 150 seconds/100 cm$^3$. Likewise, the lower limit of the air permeability should more desirably be 50 seconds/100 cm$^3$.

The heat shrinkage ratio of the porous sheet upon being left to stand at 120° C. for 1 hour is preferably 20% or less. If this heat shrinkage ratio exceeds 20%, it may become difficult to obtain satisfactory bonding strength between the positive and negative electrodes and the separator. The heat shrinkage ratio is more preferably 15% or less.

The porous sheet preferably has a porosity of 30 to 70% for the reasons explained below. If the porosity is less than 30%, good electrical holding properties may become difficult to obtain in the separator. On the other hand, if the porosity exceeds 70%, no satisfactory separator strength may be obtained. A more favorable range of the porosity is 35 to 70%.

It would be preferable to carry out the integration of these positive electrode, negative electrode and separator by making use of an adhesive polymer as mentioned below in such a way that the ends perpendicular to the longitudinal direction of the separator are extended further by a length of 0.25 mm to 2 mm from the ends perpendicular to the longitudinal direction of the negative electrode, and at the same time, an adhesive polymer is attached to these extended end portions of the separator. When these positive electrode, negative electrode and separator are integrated in this manner, it becomes possible to suppress the generation of internal short-circuit even if a shock is given to the secondary battery. It is also possible, according to this construction, to inhibit the separator from being thermally shrunk when the secondary battery is used under a high-temperature environment of 100° C. or more, thereby making it possible to inhibit the generation of internal short-circuit and to improve the safety of the secondary battery.

(4) Nonaqueous Electrolyte

The nonaqueous electrolyte is at least held in the separator. In particular, the nonaqueous electrolyte should preferably be dispersed throughout the electrode group. The nonaqueous electrolyte used in the present invention includes, for example, a liquid nonaqueous electrolyte consisting of a nonaqueous solvent having a solute dissolved therein (hereinafter referred to as "nonaqueous solution"), a polymer body having said nonaqueous solution held therein, and a solid nonaqueous electrolyte. It is possible for the nonaqueous solution within the polymer body to be completely gelled to form a gel nonaqueous electrolyte. It is also possible for the nonaqueous solution held within the polymer body to be partly gelled with the remaining portion maintained in a liquid form. Further, it is possible for the nonaqueous solution to be in a liquid form within the polymer body. Among them, a liquid nonaqueous electrolyte is most preferable for use. Because, it is possible, according to the liquid nonaqueous electrolyte, to enhance the ionic conductivity of electrode group, thereby making it possible to minimize the interface impedance between the positive electrode and the separator as well as the interface impedance between the negative electrode and the separator.

The polymer body having said nonaqueous solution held therein can be manufactured by kneading the nonaqueous solution, a polymer and a gelatinizer, followed by heat-treating the kneaded mass to permit the kneaded mass to gel.

The polymer is at least one kind of polymer selected from the group consisting of polyvinylidene fluoride (PVdF), polyacrylonitrile (PAN), polyethylene oxide (PEO), polyvinyl chloride (PVC) and polyacrylate (PMMA).

The liquid nonaqueous electrolyte can be prepared by dissolving a solute in a nonaqueous solvent.

There is not any particular limitation as to the nonaqueous solvent, so that it would be possible to employ any kinds of nonaqueous electrolyte which are generally known as a solvent for a lithium ion secondary battery. However, it is more preferable to employ a nonaqueous solvent consisting mainly of a mixed solvent comprising a first solvent consisting of at least one kind selected from the group consisting of propylene carbonate (PC) and ethylene carbonate (EC), and a second solvent having a lower viscosity than that of the PC and EC. In particular, it would be more preferable to employ the second solvent which is 16.5 or less in the number of donor.

As for the second solvent, specific examples of which are dimethyl carbonate (DMC), methylethyl carbonate (MEC), diethyl carbonate (DEC), ethyl propionate, methyl propionate, γ-butyrolactone (BL), acetonitrile (AN), ethyl acetate (EA), toluene, xylene, methyl acetate (MA), etc. These second solvents may be employed individually or in combination thereof.

Preferably, the mixing ratio of the first solvent in the mixed solvent should be confined to 10 to 80% in volume ratio. More preferably, the mixing ratio of the first solvent in the mixed solvent should be confined to 20 to 75% in volume ratio.

As for the solute, it is possible to employ a lithium salt such as lithium perchlorate ($LiClO_4$), lithium hexafluoro phosphate ($LiPF_6$), lithium tetrafluoroborate ($LiBF_4$), lithium arsenic hexafluoride ($LiAsF_6$), lithium trifluoromethasulfonate ($LiCF_3SO_3$) and lithium bistrifluoromethyl sulfonylimide [$LiN(CF_3SO_2)_2$]. Among them, $LiPF_6$ and $LiBF_4$ are more preferable for use.

The quantity of the solute to be dissolved in the nonaqueous solvent should preferably be 0.5 to 2.0 mol/L.

One example of the nonaqueous solution which is especially preferable is one where a solute (for example, a lithium salt) is dissolved in a mixed nonaqueous solvent containing γ-butyrolactone (BL) and the mixing ratio of the BL is 20 to 80% by volume based on the total volume of mixed nonaqueous solvent. This mixed nonaqueous solvent should preferably be such that the mixing ratio of the BL is the largest in the entire components. If the BL content is lower than 20% by volume, a gas is likely to be generated under high temperatures. Also, where the mixed nonaqueous solvent contains both BL and a cyclic carbonate, the ratio of the cyclic carbonate is rendered relatively high, with the result that the viscosity of the solvent tends to be increased markedly. If the viscosity of the solvent is increased, the electric conductivity and the permeability of the nonaqueous electrolyte are lowered so as to impair the charge/discharge cycle characteristics, the large discharge characteristics, and the discharge characteristics under an environment of a low temperature around −20° C. On the other hand, if the BL content exceeds 80% by volume, the reaction between the negative electrode and BL is likely to take place, with the result that the charge/discharge cycle characteristics tend to be impaired. To be more specific, if the negative electrode containing, for example, a carbon material capable of absorbing and desorbing lithium ions is reacted with BL to bring about a reducing decomposition of the nonaqueous electrolyte, a film inhibiting the charge-discharge reaction is formed on the surface of the negative electrode. As a result, a current concentration tends to take place in the negative electrode so as to bring about undesirable phenomena. For example, lithium metal is precipitated on the surface of the negative electrode. Alternatively, an impedance is increased at the interface of the negative electrode so as to lower the charge-discharge efficiency of the negative electrode and to impair the charge-discharge cycle characteristics. Preferably, the BL content of the nonaqueous solvent should fall within a range of between 40% and 75% by volume. Where the BL content of the nonaqueous solvent falls within the range specified in the present invention, the gas generation during storage of the secondary battery under high temperatures can be suppressed more effectively. Also, it is possible to further improve the discharge capacity under low temperatures about −20° C.

It is desirable to use a cyclic carbonate together with BL in the present invention because the cyclic carbonate permits improving the charge-discharge efficiency.

The cyclic carbonate used in the present invention includes, for example, propylene carbonate (PC), ethylene carbonate (EC), vinylene carbonate (VC), and trifluoropropylene carbonate (TFPC). Particularly, if EC is used together with BL, the charge-discharge characteristics and the large discharge characteristics can be markedly improved. It is also desirable to prepare a mixed solvent by mixing BL with at least one kind of a third solvent selected from the group consisting of PC, VC, TFPC, diethyl carbonate (DEC), methyl ethyl carbonate (MEC) and an aromatic compound. The mixed solvent of the particular construction permits improving the charge-discharge cycle characteristics.

In order to decrease the viscosity of the mixed solvent, it is possible for the nonaqueous solvent containing BL to further contain 20% by volume or less of a solvent having a low viscosity selected from the group consisting of, for example, a chain carbonate, a chain ether, and a cyclic ether.

Preferred combinations of the nonaqueous solvents used in the present invention include, for example, a combination of BL and EC, a combination of BL and PC, a combination of BL, EC and DEC, a combination of BL, EC and MEC, a combination of BL, EC, MEC and VC, a combination of BL, EC and VC, a combination of BL, PC and VC, and a combination of BL, EC, PC and VC. In this case, it is desirable to set the mixing ratio of EC to fall within a range of between 5 an 40% by volume. It should be noted in this connection that, if the mixing amount of EC is smaller than 5% by volume, it is difficult to cover densely the surface the surface of the negative electrode with a protective film, giving rise to a possibility that a reaction may take place between the negative electrode and BL. As a result, it is difficult to improve sufficiently the charge-discharge cycle characteristics. On the other hand, if the mixing amount of EC exceeds 40% by volume, the viscosity of the nonaqueous solution is unduly increased so as to lower the ionic conductance. As a result, it is difficult to improve sufficiently the charge-discharge cycle characteristics, the large discharge characteristics and the low temperature discharge characteristics. More preferably, the EC amount should fall within a range of between 10 and 35% by volume. Also, it is desirable for at least one of the solvents selected from the group consisting of DEC, MEC and VC to fall within a range of between 0.01 and 10% by volume.

The solutes similar to those enumerated previously can be used in the present invention. Particularly, it is desirable to use $LiPF_6$ or $LiBF_4$. The solute should desirably be dissolved in the nonaqueous solvent in an amount of 0.5 to 2.0 mol/L.

The viscosity of the nonaqueous solution at a temperature of 20° C. should preferably be confined to 3 cp to 20 cp. Because, if the viscosity of the nonaqueous solution at this temperature is less than 3 cp, the quantity of gas generation during the storage of the secondary battery under a high-temperature environment would become excessive, or the vapor pressure of the electrolyte would increase under high temperatures, thereby possibly expanding the jacket. On the other hand, if the viscosity of the nonaqueous solution at this temperature exceeds over 20 cp, the permeability of the nonaqueous solution would be deteriorated, thus increasing the internal impedance if the relationship regarding the peeling strength is confined as mentioned above. Accordingly, the viscosity of the nonaqueous solution at a temperature of 20° C. should more preferably be confined to 4 cp to 15 cp. The viscosity should most preferably be confined to 6 cp to 8 cp.

Among the nonaqueous solution having a viscosity confined within the range of 3 cp to 20 cp (at 20° C.), it would be more preferable to employ one where a solute is dissolved in a nonaqueous solvent containing ethylene carbonate (EC) and a solvent A consisting of at least one kind of compound selected from the group consisting of propylene carbonate (PC), diethyl carbonate (DEC) and γ-butyrolactone (BL).

The volume ratio of the solvent A in the nonaqueous solvent should preferably be confined to 50 to 90% by volume. Because, if the volume ratio is less than 50% by volume, gas may be more likely to be generated under high temperatures. Also, the discharge characteristics under an environment of a low temperature around −20° C. may be lowered. On the other hand, when the volume ratio exceeds over 90% by volume, the reduction decomposition of the nonaqueous electrolyte tends to be caused to occur. Once the reduction decomposition of the nonaqueous electrolyte is caused to occur, a film which interferes the charge/discharge reaction may be formed on the surface of the negative electrode. As a result, a concentration of current tends to be generated at the negative electrode, thus leading to the precipitation of lithium metal on the surface of the negative electrode, or leading to an increase of impedance at the interface of the negative electrode.

Alternatively, charge/discharge efficiency of the negative electrode deteriorates, thus leading to the deterioration of the charge/discharge cycle characteristic of the secondary battery. Accordingly, a more preferable mixing ratio of the solvent A in the nonaqueous solvent is in the range of 60 to 80% by volume.

The volume ratio of the EC in the nonaqueous solvent should preferably be confined to 5 to 40% by volume. Because, if the volume ratio is less than 5% by volume, it may become difficult to densely cover the surface of the negative electrode with a protective film, thereby easily giving rise to the reduction decomposition of the nonaqueous electrolyte. As a result, it may become difficult to sufficiently improve the charge/discharge cycle of the secondary battery. On the other hand, if the volume ratio of EC exceeds over 40% by volume, the ratio of the solvent A becomes relatively lower, thus leading to an increase in generation of gas during a high-temperature storage of the secondary battery. The volume ratio of EC should more preferably be set to 10 to 35% by volume.

Further, it is more preferable that the nonaqueous solvent further contains vinylene carbonate (VC). The volume ratio of the VC in the nonaqueous solvent should preferably be confined to the range of 0.01 to 10% by volume.

As for the solute, the same kind of material as exemplified above would be employed. Among them, the employment of $LiPF_6$ or $LiBF_4$ is more preferable.

The quantity of the solute to be dissolved in the nonaqueous solvent should preferably be 0.5 to 2.0 mol/L.

The quantity of the liquid nonaqueous electrolyte should preferably be confined to the range of 0.2 to 0.6 g per 100 mAh of cell unit capacity. Because, if the quantity of the liquid nonaqueous electrolyte is less than 0.2 g/100 mAh, it may become difficult to secure a sufficient ionic conductivity of the positive and negative electrodes. On the other hand, if the quantity of the liquid nonaqueous electrolyte exceeds over 0.6 g/100 mAh, it may become difficult, due to the excessive quantity of the electrolyte, to seal the jacket if a sheet-like jacket material is employed. Accordingly, a preferable quantity of the liquid nonaqueous electrolyte is in the range of 0.4 to 0.55 g/100 mAh.

(5-1) Jacket A

This jacket A has a thickness of not more than 0.3 mm.

This jacket A can be formed using for example a metal can or a sheet which is capable of shielding water. As for the metal can, it can be made from iron, stainless steel or aluminum. As for the sheet, it may be a multi-layer sheet "a" consisting of two or more kinds of resin layer wherein one or both surfaces thereof are formed by a thermoplastic resin layer, or a multi-layer sheet "b" comprising a flexible metallic layer, on one or both surfaces of which a protective layer is laminated. In particular, the employment of the multi-layer sheet "b" is preferable, because it is light in weight, high in strength and effective in preventing water from entering into the interior thereof from the outside thereof.

As for the metallic layer of the multi-layer sheet "b", it is possible to employ aluminum, stainless steel, iron, copper, nickel, etc. Among them, aluminum is most preferable, since it is light in weight and excellent in the water-shielding property. This metallic layer may be formed of a single kind of metal, or formed of two or more kinds of metal layer which are integrated with each other.

The protective layer for forming the inner surface of the jacket functions not only as a heat-sealing surface but also as a barrier for preventing the metallic layer from being corroded by the nonaqueous electrolyte. The protective layer for forming the outer surface of the jacket functions to prevent the metallic layer from being damaged. Each protective layer is formed of a single kind of resin layer or of a laminate layer consisting of two or more kinds of resin layer. Each protective layer should preferably be formed of a thermoplastic resin. The thermoplastic resin for forming the protective layer constituting the inner surface of the jacket should preferably have a melting point of not less than 120° C. or more preferably in the range of 140 to 250° C. As for the thermoplastic resin, it is possible to employ polyethylene, polypropylene, etc. In particular, it is preferable to employ polypropylene having a melting point of 150° C. or more, since it is capable of improving the sealing strength of the heat-sealing portion.

If the thickness of the jacket A is larger than 0.3 mm, the effect of thinning the battery would be minimized. In other words, it would become difficult to sufficiently enhance both the weight energy density of the battery and the volume energy density of the battery. The thickness of the jacket should preferably be confined to not more than 0.25 mm, more preferably not more than 0.2 mm. On the other hand, if the thickness of the jacket is less than 0.05 mm, the jacket may be easily deformed or damaged. Therefore, a preferable lower limit of the thickness of the jacket would be 0.05 mm.

(5-2) Jacket B

This jacket B is made of a sheet having a thickness of not more than 0.5 mm and including the resin layer.

The resin layer of this jacket B may be formed from a thermoplastic resin such as polyethylene, polypropylene, etc. One example of the jacket B is a multi-layer sheet consisting of a metallic layer, and a resin layer formed on both surfaces of the metallic layer. As for the metallic layer, it is possible to employ the same kinds of metals as exemplified with reference to the jacket A. The resin layer for forming the inner surface of the jacket functions not only as a heat-sealing surface but also as a barrier for preventing the metallic layer from being corroded by the nonaqueous electrolyte. The resin layer for forming the outer surface of the jacket functions to prevent the metallic layer from being damaged. Each resin layer may be formed of a single kind of resin layer or of a laminate layer consisting of two or more kinds of resin layer. Each resin layer should preferably be formed of a thermoplastic resin. The thermoplastic resin for forming the resin layer constituting the inner surface of the jacket should preferably have a melting point of not less than 120° C. or more preferably in the range of 140 to 250° C. As for the thermoplastic resin, it is possible to employ polyethylene, polypropylene, etc. In particular, it is preferable to employ polypropylene having a melting point of 150° C. or more, since it is capable of improving the sealing strength of the heat-sealing portion.

If the thickness of the jacket B is larger than 0.5 mm, both the capacity per unit weight of the battery and the capacity per unit volume of the battery would be deteriorated. Preferably, the thickness of the jacket B should be confined to not more than 0.3 mm, more preferably not more than 0.25 mm, most preferably not more than 0.2 mm. On the other hand, if the thickness of the jacket B is less than 0.05 mm, the jacket B may be easily deformed or damaged. Therefore, a preferable lower limit of the thickness of the jacket B would be 0.05 mm.

The thickness of the jackets A and B can be measured by the following method. Namely, three points each being separated from each other by a distance of 1 cm or more are optionally selected from the region of the jackets A and B excluding the heat-sealing portion, and then, the thickness of each of three points is measured. Thereafter, an average value in thickness of these points is calculated, the average value thus calculated being determined as being the thickness of the jacket. By the way, if the surface of the jacket is soiled with a foreign matter (for example, a resin), the measurement of thickness is performed after removing this foreign matter. For example, where the PVdF is adhered to the surface of the jacket, the PVdF is removed at first by wiping the surface of the jacket by making use of a solution of dimethyl formamide, and then, the thickness of the jacket is measured.

If the jackets A and B are to be constituted by a multi-layer sheet, the electrode group should preferably be disposed in such a manner that the electrode group is adhered onto the inner surfaces of the jackets A and B through an adhesive layer formed on at least a portion of the surface of electrode group. When the secondary battery is constructed in this manner, the jacket can be fixed to the surface of the electrode group, so that it becomes possible to inhibit a liquid electrolyte from penetrating into the interface between the jacket and the electrode group.

This adhesive layer may be the same material as the adhesive polymer which will be explained hereinafter. Further, this adhesive layer may be of a porous structure. A porous adhesive layer is capable of holding the nonaqueous electrolyte in the voids thereof.

A first nonaqueous electrolyte secondary battery according to this invention can be manufactured by the methods (1) or (2) shown below.

(1) Hot Molding Method (A First Step)

The electrode group can be manufactured by the following methods (a), (b) or (c).

(a) The positive electrode and the negative electrode are wound together into a spiral configuration with the separator being interposed therebetween.

(b) The positive electrode and the negative electrode are wound together into a spiral configuration with the separator being interposed therebetween, and then, the resultant spiral body is compressed in the direction of the diameter.

(c) The positive electrode and the negative electrode are folded with the separator being interposed therebetween once or repeatedly twice or more.

This positive electrode can be manufactured by a method wherein a conductive material and a binder are added to an active material, and the resultant mixture is suspended in a suitable solvent to prepare a suspension, which is then coated on the surface of a collector and dried to obtain a thin sheet-like positive electrode.

As for the active material, binder and collector, the same kind of materials as explained above with the item (2) related to "positive electrode" can be employed.

The negative electrode can be manufactured by a method wherein a carbon material capable of absorbing and desorbing lithium ion and a binder are kneaded together in the presence of a solvent to prepare a suspension, which is then coated on the surface of a collector and, after being dried, subjected to a single pressing step or a 2 to 5-time multistage pressing step to form the negative electrode.

As for the carbon material, binder and collector, the same kind of materials as explained above with the item (1) related to "negative electrode" can be employed.

As for the separator, the same kind of materials as explained above with the item (3) related to "separator" can be employed.

(A Second Step)

The electrode group is placed inside a jacket, and then, subjected to a hot molding process.

The atmosphere preferable for carrying out the hot molding may be either a reduced pressure atmosphere including vacuum, or the normal atmosphere.

The heating temperature should preferably be 30° C. or more, more preferably in the range of 60 to 100° C. If the hot molding is performed in a reduced atmosphere at a temperature of 60 to 100° C., the molding process can be performed simultaneous with the drying of the electrode group.

This molding step should preferably be performed in such a manner that if the electrode group is manufactured according to the aforementioned method (a), the electrode group is compressed in a direction of the diameter, and that if the electrode group is manufactured according to the aforementioned methods (b) or (c), the electrode group is compressed in the direction of stacking.

The aforementioned molding can be performed by press molding or forcing into a mold.

The pressure to be applied on the occasion of the molding process should be confined to the range of 0.01 to 20 kg/cm$^2$. If this pressure is higher than 20 kg/cm$^2$, a short-circuit will tend to generate. More preferable range of the pressure to be applied in the molding process is 0.01 to 15 kg/cm$^2$, because when the pressure is confined within this range, the integration of the battery can be easily achieved.

The molding time is preferably in the range of 2 sec. to 120 min.

When this hot molding is applied to the electrode group, the binder included in the positive electrode and negative electrode can be thermally cured, thereby making it possible to make all of the positive electrode, negative electrode and separator into an integral body. Furthermore, when the hot molding temperature, molding pressure and molding time are suitably adjusted, the peeling strength between the separator and the negative electrode layer can be made lower than that between the negative electrode layer and the negative electrode collector, while ensuring the integration of the positive electrode, negative electrode and separator.

(A Third Step)

The electrode group placed inside the jacket is impregnated with a liquid nonaqueous electrolyte, and then, subjected to a sealing process, thereby obtaining the first nonaqueous electrolyte secondary battery according to this invention.

Alternatively, it is also possible to obtain the first nonaqueous electrolyte secondary battery of this invention by another process wherein the electrode group is at first heat-molded prior to the placement of the electrode group in the jacket, after which the electrode group is placed in the jacket and then, a liquid nonaqueous electrolyte is poured into the jacket, subjected to the sealing process.

(2) Method Employing an Adhesive Polymer
(A First Step)

The electrode group is manufactured by placing a separator between the positive electrode and the negative electrode.

Namely, this electrode group can be preferably manufactured by the methods as explained with reference to the aforementioned hot molding method. When the electrode group is manufactured in this manner, it is possible, in the following second step, to prevent the solution of adhesive polymer from spreading throughout the entire boundary between the positive electrode and the separator as well as throughout the entire boundary between the negative electrode and the separator, while allowing the solution of adhesive polymer to penetrate into the positive electrode, negative electrode and separator. Consequently, the adhesive polymer can be dispersedly present in the positive electrode, the negative electrode and the separator and can be dispersedly present in a boundary between the positive electrode and the separator and in a boundary between the negative electrode and the separator.

The positive electrode and negative electrode can be manufactured in the same manner as explained with reference to the aforementioned hot molding method. Further, as for the porous sheet of separator, the same kind of materials as explained above with the item (3) related to "separator" can be employed.

(A Second Step)

The electrode group is then placed in a bag-like jacket in such a manner that the laminated surface of the electrode group can be seen from the opening of the bag. Thereafter, a solution prepared by dissolving an adhesive polymer in a solvent is poured into the electrode group through the open portion of the bag, thereby impregnating the electrode group with the solution.

It is desirable for the adhesive polymer to exhibit a maintain a high adhesivity under the state holding a nonaqueous electrolyte. It is also desirable for the adhesive polymer to exhibit a high lithium ion conductivity. As the adhesive polymer, it is possible to use one or more types of polymers selected from the group consisting of polyacrylonitrile (PAN), polyacrylate (PMMA), polyvinylidene fluoride (PVdF), polyvinyl chloride (PVC) and polyethylene oxide (PEO). Of these polymers, PVdF is most preferred. PVdF can hold the nonaqueous electrolyte in place and partially gels in the presence of the nonaqueous electrolyte. This further improves the ion conductivity of the positive electrode.

The solvent is desirably an organic solvent having a boiling point of 200° C. or less. Dimethylformamide (boiling point 153° C.), is an example of this organic solvent. If the boiling point of the organic solvent exceeds 200° C., a long drying time may be necessary when the temperature of drying (to be described later) is set at 100° C. or less. The lower limit of the organic solvent boiling point is preferably 50° C. If the organic solvent boiling point is lower than 50° C., the organic solvent may evaporate while the solution is injected into the electrode group. The upper limit of the boiling point is more preferably 180° C., and its lower limit is more preferably 100° C.

The concentration of the adhesive polymer in the solution is preferably 0.05 to 2.5% by weight for following reasons. If the concentration is less than 0.05% by weight, it may become difficult to bonding between the positive electrode and the separator, and between the negative electrode and the separator, with sufficient strength. on the other hand, if the concentration exceeds 2.5% by weight, it may be difficult to obtain porosity large enough to hold the nonaqueous electrolyte in place, and the interface impedance of the electrode may increase. If the interface impedance increases, the capacity and the large discharge characteristics greatly degrade. A more favorable range of the concentration is 0.1 to 1.5% by weight.

When the concentration of the adhesive polymer in the solution is 0.05 to 2.5% by weight, the injection amount of solution is preferably 0.1 to 2 mL per 100 mAh battery capacity for the following reasons. If the injection amount is smaller than 0.1 mL, it may become difficult to well improve the adhesion strength between the positive electrode and the separator and between the negative electrode and the separator. On the other hand, if the injection amount exceeds 2 mL, the lithium ion conductivity of the secondary battery may decrease, or its internal resistance may increase. This may make it difficult to improve the discharge capacity, large discharge characteristics, and charge-discharge cycle life. A more favorable range of the injection amount is 0.15 to 1 mL per 100 mAh battery capacity.

(A Third Step)

Then, a hot molding is performed.

The atmosphere preferable for carrying out the hot molding may be either a reduced pressure atmosphere including vacuum, or the normal atmosphere.

The heating temperature should preferably be 30° C. or more, more preferably in the range of 60 to 100° C. If the hot molding is performed in a reduced atmosphere at a temperature of 60 to 100° C., the molding process can be performed simultaneous with the drying of the electrode group.

This molding step should preferably be performed in such a manner that if the electrode group is manufactured according to the aforementioned method (a), the electrode group is compressed in the direction of the diameter, and that if the electrode group is manufactured according to the aforementioned methods (b) or (c), the electrode group is compressed in the direction of stacking.

The aforementioned molding can be performed by press molding or forcing into a mold.

The pressure to be applied on the occasion of the molding process should be confined to the range of 0.01 to 20 kg/cm$^2$. More preferable range of the pressure to be applied in the molding process is 0.01 to 15 kg/cm$^2$.

The molding time is preferably in the range of 2 sec. to 120 min.

When this hot molding is applied to the electrode group, the solvent included in the electrodes, etc.-can be evaporated, thereby making it possible to make all of the positive electrode, negative electrode and separator into an integral body. Furthermore, when the quantity of the adhesive polymer, hot molding temperature, molding pressure and molding time are suitably adjusted in this hot molding, the peeling strength between the separator and the negative electrode layer can be made lower than that between the negative electrode layer and the negative electrode collector, while ensuring the integration of the positive electrode, negative electrode and separator.

(A Fourth Step)

The electrode group placed inside the jacket is impregnated with a liquid nonaqueous electrolyte, and then, subjected to a sealing process, thereby obtaining the first nonaqueous electrolyte secondary battery according to this invention.

Alternatively, it is also possible to obtain the first nonaqueous electrolyte secondary battery of this invention by another process wherein the electrode group is at first allowed to be impregnated with a solution of the adhesive polymer and then, heat-molded prior to the placement of the electrode group in the jacket, after which the electrode group is placed in the jacket and then, a nonaqueous electrolyte is injected into the jacket, the resultant jacket being subsequently subjected to the sealing process. Further, it is also possible to apply a coating of an adhesive to the outer peripheral surface of the electrode group prior to the placement of the electrode group in the jacket, thereby enabling the electrode group to adhere onto the inner surface of the jacket.

In a case where the secondary battery is to be manufactured by a method employing an adhesive polymer, the total amount of the adhesive polymers contained in the battery (including the adhesive polymer contained in the adhesive portion described later) is preferably 0.1 to 6 mg per 100 mAh battery capacity for the reasons explained below. If the total amount of the adhesive polymers is less than 0.1 mg per 100 mAh battery capacity, it may become difficult to well increase the adhesion strength between the positive electrode and the separator and between the negative electrode and the separator. On the other hand, if the total amount exceeds 6 mg per 100 mAh battery capacity, the lithium ion conductivity of the secondary battery may decrease, or its internal resistance may increase. This may make it difficult to well improve the discharge capacity, large discharge characteristics, and charge/discharge cycle life. A more preferable range of the total amount of adhesive polymers is 0.2 to 1 mg per 100 mAh battery capacity.

In a case where the secondary battery is to be manufactured by a method employing an adhesive polymer, the adhesive polymer should preferably be held in the voids existing in the positive electrode, negative electrode and separator. Further, when the adhesive polymer is interspersed in the electrode group, the internal impedance of the secondary battery can be preferably minimized.

Additionally, the adhesive polymer should preferably have fine pores when the adhesive polymer is existed into the voids of the positive electrode, negative electrode and separator. Because, a large quantity of nonaqueous electrolyte can be kept inside the porous structure of adhesive polymer. Further, it is also preferable to uniformly disperse and intersperse the adhesive polymer in the electrode group.

Next, a thin lithium ion secondary battery representing the first nonaqueous electrolyte secondary battery according to this invention will be explained with reference to FIGS. 3 and 4.

Figure 3:
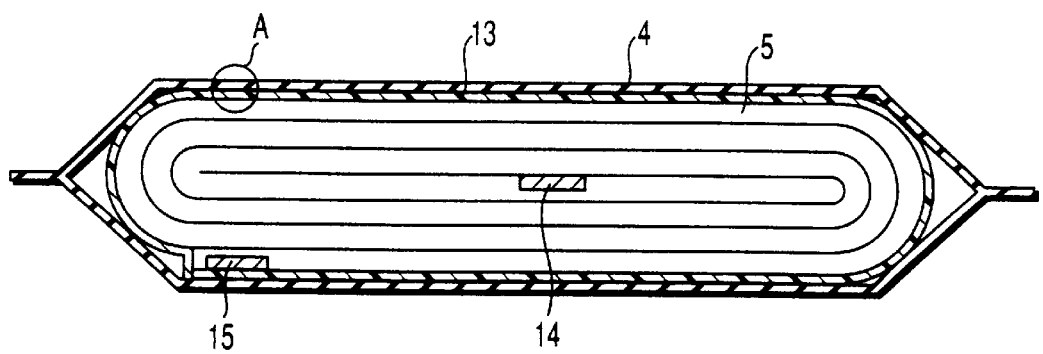
FIG. 3 is a cross-sectional view showing a thin lithium ion secondary battery representing one example of a first nonaqueous electrolyte secondary battery according to this invention.
Figure 4:
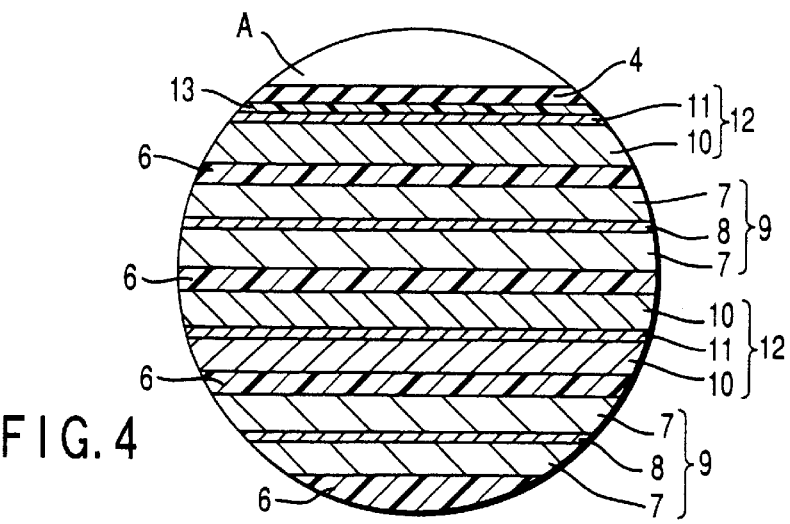
FIG. 4 is an enlarged cross-sectional view showing the portion A shown in FIG. 3.

FIG. 3 is a cross-sectional view showing a thin lithium ion secondary battery representing one example of the first nonaqueous electrolyte secondary battery according to this invention; and FIG. 4 is an enlarged cross-sectional view showing the portion A shown in FIG. 3.

Referring to FIG. 3, an electrode group 5 is housed inside a jacket 4 consisting of a multi-layer sheet for instance. This electrode group 5 has a structure wherein a laminate body consisting of a positive electrode, a separator and a negative electrode is spirally wound and flattened, forming an oblong cross-sectional configuration. This laminate body comprises, mentioning from the bottom side thereof shown in FIG. 4, a separator 6; a positive electrode 9 having a positive electrode layer 7, a positive electrode collector 8 and a positive electrode layer 7; a separator 6; a negative electrode 12 having a negative electrode layer 10, a negative electrode collector 11 and a negative electrode layer 10; the separator 6; the positive electrode 9 having the positive electrode layer 7, the positive electrode collector 8 and the positive electrode layer 7; the separator 6; and the negative electrode 12 having the negative electrode layer 10 and the negative electrode collector 11, which are laminated in the mentioned order. The outermost periphery of the electrode group 5 is the negative electrode collector 11. A adhesive layer 13 is interposed between the surface of the electrode group 5 and the inner surface of the jacket 4. A nonaqueous electrolyte is contained inside the jacket 4. A strip-like positive electrode lead 14 is connected at one end thereof with the positive electrode collector 8 of the electrode group 5, the other end of the positive electrode lead 14 being extended from the jacket 4. On the other hand, a strip-like negative electrode lead 15 is connected at one end thereof with the negative electrode collector 11 of the electrode group 5, the other end of the negative electrode lead 15 being extended from the jacket 4.

Although the adhesive layer 13 is formed all over the surface of the electrode group 5 in the embodiment shown in FIG. 3, the adhesive layer 13 may be formed partially on surface of the electrode group 5. If the adhesive layer 13 is to be formed partially on surface of the electrode group 5, the adhesive layer 13 should preferably be formed at least on the surface corresponding to the outermost periphery of the electrode group. Alternatively, the adhesive layer 13 may be omitted.

Figure 5:
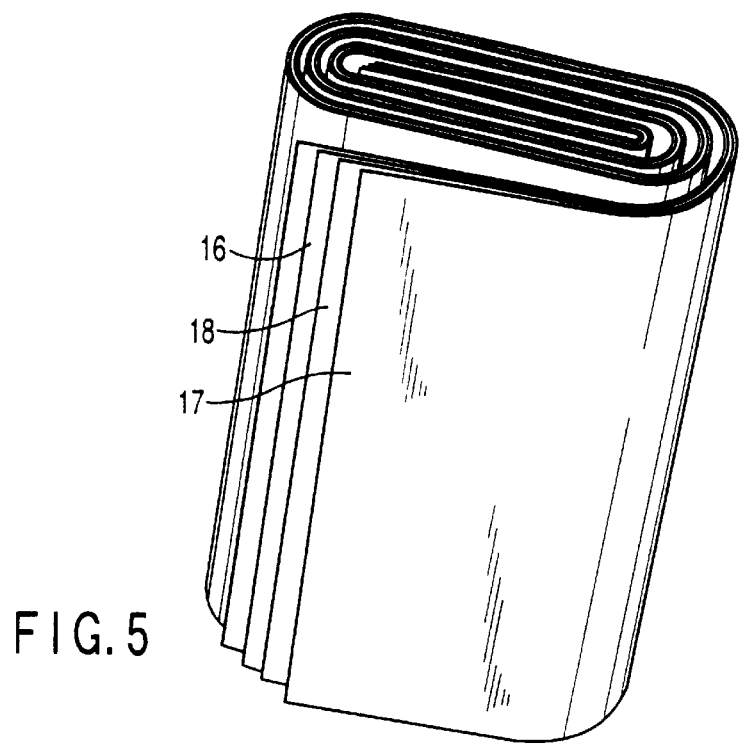
FIG. 5 is a perspective view illustrating another example of the electrode group to be incorporated in the thin lithium ion secondary battery shown in FIG. 3.

In the case of the embodiment shown in FIG. 3, there is explained an electrode group which is produced at first by spirally winding a laminate body comprising a plurality of the positive electrodes and a plurality of the negative electrodes, and then, by compressing the resultant wound body in the radial direction thereof. However, it is also possible to employ an electrode group shown in FIG. 5, which can be produced at first by spirally winding a sheet of positive electrode 16 and a sheet of negative electrode 17 with a separator 18 being interposed therebetween, and then, by compressing the resultant wound body in the radial direction thereof.

Figure 6:
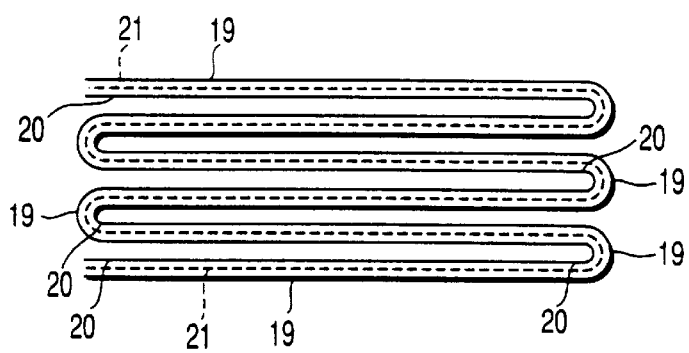
FIG. 6 is a side view illustrating still another example of the electrode group to be incorporated in the thin lithium ion secondary battery shown in FIG. 3.

In reference to FIG. 3, there is explained an electrode group which is produced at first by spirally winding the positive electrodes and the negative electrodes with a separator interposed therebetween, and then, by compressing the resultant wound body in the radial direction thereof. However, it is also possible to employ an electrode group having a folded structure comprising a positive electrode and a negative electrode with a separator being interposed therebetween. FIG. 6 shows one example of such a folded structure. Referring to FIG. 6, the electrode group comprises a positive electrode 19 and a negative electrode 20 with a separator 21 being interposed therebetween, which are repeatedly folded (five times) in such a manner that the folded portions of negative electrode 20 are contacted with each other. When the electrode group is made into this folded structure, the manufacture of the electrode group can be simplified and at the same time, the mechanical strength of the electrode group can be improved.

Figure 7:
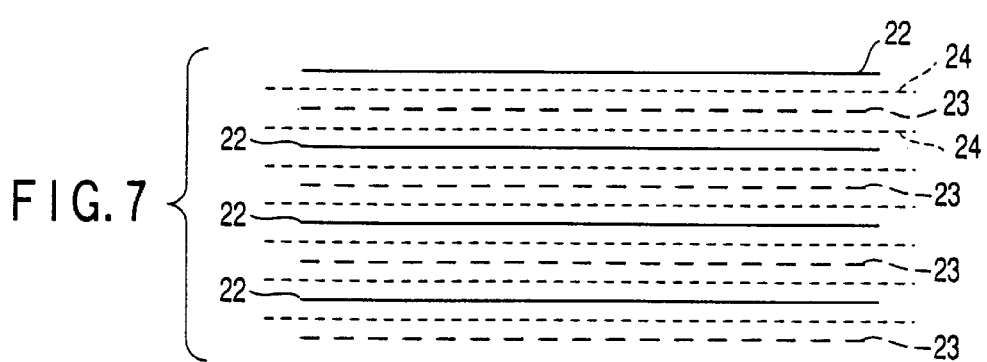
FIG. 7 is a side view illustrating still another example of the electrode group to be incorporated in the thin lithium ion secondary battery shown in FIG. 3.

In reference to FIG. 3, though there is explained the employment of an electrode group which is produced at first by spirally winding the positive electrodes and the negative electrodes with a separator interposed therebetween, and then, by compressing the resultant wound body in the radial direction thereof, it is also possible to employ an electrode group as shown in FIG. 7. Namely, this electrode group is constructed such that a plurality of positive electrodes 22 and a plurality of negative electrodes 23 are prepared, and then, these positive electrodes 22 and negative electrodes 23 are alternately laminated one another with a separator 24 being interposed therebetween, thereby manufacturing the electrode group.

The first nonaqueous electrolyte secondary battery comprises an electrode group comprising a positive electrode, a negative electrode having a negative electrode collector and a negative electrode layer held to the collector, and a separator interposed between the positive electrode and the negative electrode layer; a nonaqueous electrolyte held by the electrode group; and a jacket housing the electrode group. The positive electrode, the negative electrode and the separator are made into an integral body. Further, the peeling strength between the negative electrode layer and the separator is lower than the peeling strength between the negative electrode layer and the negative electrode collector.

It is desired in this nonaqueous electrolyte secondary battery to improve both the energy density per unit weight of the battery and the energy density per unit volume of the battery. Therefore, it is required to employ a jacket A having a thickness of not more than 0.3 mm, or to employ a jacket B being made of a sheet having a thickness of not more than 0.5 mm and including the resin layer. However, since the jackets A and B are flexible, the jackets A and B are more likely to be deformed following the expansion or shrinkage of the electrode group due to the charging/discharging reaction.

When the peeling strength between the negative electrode layer and the separator is made identical with or higher than the peeling strength between the negative electrode layer and the negative electrode collector, the adhesive strength between the negative electrode layer and the negative electrode collector which is relatively low would be deteriorated due to the repetition of the expansion and shrinkage of electrode group in the process of the charge/discharge reaction of the battery. Additionally, the adhesive strength between the negative electrode layer and the separator would become irregular. As a result, the interface impedance between the negative electrode layer and the separator would become higher, and a concentration of current would be generated at the negative electrode on the occasion of the charge/discharge reaction, thereby causing lithium dendrite to precipitate at the negative electrode and hence, deteriorating the charge/discharge cycle life.

When the peeling strength between the negative electrode layer and the separator is made lower than the peeling strength between the negative electrode layer and the negative electrode collector, it is possible to inhibit the adhesive strength between the negative electrode layer and the negative electrode collector from being deteriorated in the repetition of the expansion and shrinkage of electrode group in the process of the charge/discharge reaction of the battery. Additionally, the adhesive strength between the negative electrode layer and the separator can be made uniform. As a result, the interface impedance between the negative electrode layer and the separator can be minimized, thereby making it possible to inhibit a current concentration at the negative electrode on the occasion of the charge/discharge reaction. Therefore, it is possible to prevent lithium dendrite from being precipitated at the negative electrode while ensuring both a high energy density per unit weight and a high energy density per unit volume, thus making it possible to improve not only the charge/discharge cycle life but also the large discharge characteristic of the secondary battery.

When the jacket A is employed in this first nonaqueous electrolyte secondary battery of this invention, the energy density per unit weight and the energy density per unit volume can be further improved.

When the peeling strength between the negative electrode layer and the separator is set to not more than 10 gf/cm in this first nonaqueous electrolyte secondary battery of this invention, the interface impedance between the negative electrode and the separator can be further minimized, so that the large discharge characteristic and the cycle life of the secondary battery can be further improved.

When the peeling strength between the negative electrode layer and the negative electrode collector is set to the range of 10 gf/cm to 20 gf/cm in this first nonaqueous electrolyte secondary battery of this invention, the interface impedance between the negative electrode and the separator can be further minimized, and at the same time, the adhesive strength between the negative electrode layer and the negative electrode collector can be further enhanced, so that the large discharge characteristic and cycle life of the secondary battery can be further improved.

When a nonaqueous electrolyte which contains a solution having a viscosity of 3 cp to 20 cp (at 20° C.) and prepared by dissolving a solute in a nonaqueous solvent is employed as a nonaqueous electrolyte in this first nonaqueous electrolyte secondary battery of this invention, the large discharge characteristic and cycle life of the secondary battery can be improved and at the same time, the safety on the occasion of employment thereof in a high-temperature environment can be improved.

Namely, since a nonaqueous solution having a viscosity of 3 cp to 20 cp (at 20° C.) is high in viscosity, the permeability thereof into the electrode group is low, though it is possible to inhibit the generation of gas during the storage of the secondary battery in a high-temperature environment. Since aformentioned nonaqueous relectrolyte is tend to distribute non-uniformly in the electrode group, if the interface impedance between the separator and the negative electrode is high due to the relationship of the peeling strength wherein the peeling strength between the negative electrode layer and the separator is made identical with or higher than the peeling strength between the negative electrode layer and the negative electrode collector, the interface impedance would be greatly increased. As a result, both the discharge capacity and large discharge characteristic deteriorates.

When the peeling strength between the negative electrode layer and the separator is made lower than the peeling strength between the negative electrode layer and the negative electrode collector according to this invention, it is possible to prevent the interface impedance from sharply rising on the occasion where a nonaqueous electrolyte containing a solution having a viscosity of 3 cp to 20 cp (at 20° C.) is employed. As a result, the generation of gas on the occasion of a high-temperature storage can be inhibited by taking advantage of the characteristic of the nonaqueous electrolyte containing the solution having a viscosity of 3 cp to 20 cp (at 20° C.), and at the same time, the large discharge characteristic and charge/discharge cycle life of the secondary battery can be improved.

When the nonaqueous solvent contains at least one kind of the solvent A selected from the group consisting of propylene carbonate (PC), diethyl carbonate (DEC) and γ-butyrolactone (BL), and ethylene carbonate (EC), the large discharge characteristic and charge/discharge cycle life of the secondary battery can be improved, and at the same time, the generation of gas on the occasion of a high-temperature storage can be minimized.

Namely, since the solvent A is excellent in chemical stability, the inclusion of the solvent A in the nonaqueous solvent is effective in inhibiting the oxidative decomposition of the nonaqueous electrolyte through a reaction between the positive electrode active material and the nonaqueous electrolyte during the storage of the battery under a high-temperature condition. As a result, since the generation of gas can be minimized, the swelling of the jacket can be inhibited. Further, since ethylene carbonate is capable of forming a protective film on the surface of the negative electrode, it is possible to inhibit a reaction between the solvent A and the negative electrode, in particular, the negative electrode containing a carbon material which is capable of absorbing and desorbing lithium ion, thereby making it possible to suppress the reductive decomposition of the nonaqueous electrolyte. Therefore, it is now possible to provide a nonaqueous electrolyte secondary battery which is capable of improving the large discharge characteristic and charge/discharge cycle life thereof, and of minimizing the generation of gas on the occasion of the high-temperature storage thereof.

The first nonaqueous electrolyte secondary battery according to another embodiment of this invention comprises an electrode group comprising a positive electrode having a positive electrode collector and a positive electrode layer held to the collector, a negative electrode having a negative electrode collector and a negative electrode layer held to the collector, and a separator interposed between the positive electrode layer and the negative electrode layer; a nonaqueous electrolyte held by the electrode group; and a jacket housing the electrode group. The positive electrode, the negative electrode and the separator are made into an integral body. Further, the peeling strength between the positive electrode layer and the separator is lower than the peeling strength between the positive electrode layer and the positive electrode collector, and the peeling strength between the negative electrode layer and the separator is lower than the peeling strength between the negative electrode layer and the negative electrode collector.

When the secondary battery is constructed in this manner, it is possible, not only in the negative electrode but also in the positive electrode, to inhibit the adhesive strength between the positive electrode layer and the positive electrode collector from being deteriorated in the repetition of the expansion and shrinkage of electrode group in the process of the charge/discharge reaction of the battery. Additionally, the adhesive strength between the positive electrode and the separator can be made uniform. As a result, the interface impedance between the positive electrode and the separator can be minimized, thereby making it possible to improve not only the charge/discharge cycle life but also the large discharge characteristic of the secondary battery.

When the jacket A is employed in this first nonaqueous electrolyte secondary battery of this invention, the energy density per unit weight and the energy density per unit volume can be further improved.

When the peeling strength between the negative electrode layer and the separator, and/or between the positive electrode layer and the separator is set to not more than 10 gf/cm in this first nonaqueous electrolyte secondary battery of this invention, the large discharge characteristic and the cycle life of the secondary battery can be further improved.

When the peeling strength between the negative electrode layer and the negative electrode collector, and/or between the positive electrode layer and the positive electrode collector is set to the range of 10 gf/cm to 20 gf/cm in this first nonaqueous electrolyte secondary battery of this invention, the large discharge characteristic and cycle life of the secondary battery can be further improved.

When a nonaqueous electrolyte which contains a solution having a viscosity of 3 cp to 20 cp (at 20° C.) and prepared by dissolving a solute in a nonaqueous solvent is employed as a nonaqueous electrolyte in this first nonaqueous electrolyte secondary battery of this invention, the large discharge characteristic and cycle life of the secondary battery can be improved and at the same time, the safety on the occasion of employment thereof in a high-temperature environment can be improved.

When the nonaqueous solvent contains at least one kind of the solvent A selected from the group consisting of propylene carbonate (PC), diethyl carbonate (DEC) and γ-butyrolactone (BL), and ethylene carbonate (EC), the large discharge characteristic and charge/discharge cycle life of the secondary battery can be improved, and at the same time, the generation of gas on the occasion of a high-temperature storage can be extremely minimized.

Next, the second nonaqueous electrolyte secondary battery according to this invention will be explained.

The second nonaqueous electrolyte secondary battery according to this invention comprises an electrode group of flattened configuration which comprises of a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, at least one of which is occupied by a positive electrode collector. As for the jacket, the aforementioned jacket A or jacket B can be employed. As for the separator and the liquid nonaqueous electrolyte, the same kind of materials as explained in the aforementioned first nonaqueous electrolyte secondary battery can be employed.

Followings are explanation on the positive electrode and the negative electrode.

(1) Positive Electrode

This positive electrode comprises a positive electrode collector, and a positive electrode layer containing an active material and a binder, and carried by one surface or both surfaces of the positive electrode collector.

This positive electrode layer may additionally contain a conductive agent.

As for these active material for positive electrode, binder, conductive agent and collector, the same kind of materials as explained in the aforementioned first nonaqueous electrolyte secondary battery can be employed.

The mixing ratios of these active material for positive electrode, conductive agent and binder should preferably be 80 to 95% by weight for the active material for positive electrode, 3 to 20% by weight for the conductive material, and 2 to 7% by weight for the binder.

The thickness of the positive electrode layer should preferably be in the range of 10 to 150 $\mu$m because of the reasons as explained in the aforementioned first nonaqueous electrolyte secondary battery. A more preferable range of the thickness of the positive electrode layer is in the range of 30 to 100 $\mu$m.

(2) Negative Electrode

This negative electrode comprises a negative electrode collector, and a negative electrode layer containing a negative electrode material and a binder, and carried by one surface or both surfaces of the negative electrode collector.

As for these active material for negative electrode, binder, and negative electrode collector, the same kind of materials as explained in the aforementioned first nonaqueous electrolyte secondary battery can be employed.

The mixing ratios of these carbon material and binder should preferably be 90 to 98% by weight for the carbon material and 2 to 20% by weight for the binder. In particular, the content of the carbon material in the negative electrode should preferably be in the range of 10 to 80 g/cm$^2$ as measured on one surface thereof. Further, the packing density should preferably be in the range of 1.2 to 1.50 g/cm$^3$.

The thickness of the negative electrode layer should preferably be in the range of 10 to 150 μm because of the reasons as explained in the aforementioned first nonaqueous electrolyte secondary battery. A more preferable range of the thickness of the negative electrode layer is in the range of 30 to 100 μm.

As for the materials for the negative electrode, it is possible to employ, other than the carbon material which is capable of absorbing and desorbing lithium ion, a metal oxide, a metal sulfide, a metal nitride, lithium metal or a lithium alloy.

As for the materials for the metal oxide, a metal sulfide, a metal nitride, lithium metal and a lithium alloy, the same kind of materials as explained in the aforementioned first nonaqueous electrolyte secondary battery can be employed.

The surface area of the negative electrode should preferably be larger than that of the positive electrode. When the negative and positive electrodes are constructed in this manner, the end portion of the negative electrode can be extended further as compared with the end portion of the positive electrode, thereby making it possible to alleviate a current concentration to the end portion of the negative electrode and to improve the charge/discharge property and safety of the secondary battery.

The flattened electrode group can be manufactured by the following methods (1), (2), (3) or (4).

(1) The positive electrode and the negative electrode are wound together into a spiral configuration with the separator being interposed therebetween. Thereafter, the resultant spiral body is compressed in the radial direction thereof to manufacture the flattened electrode group.

(2) A laminate body consisting of the positive electrode, the negative electrode and the separator interposed between the positive electrode and the negative electrode is folded once, or is repeatedly folded several times to thereby obtain the flattened electrode group.

(3) A laminate body consisting of the positive electrode, the negative electrode and the separator interposed between the positive electrode and the negative electrode is manufactured to obtain the flattened electrode group.

(4) The flattened configuration of the electrode group is the one which can be obtained by spirally winding the positive electrode and the negative electrode with the separator being interposed therebetween in a flattened shape.

Herein, the expression of "the surface having a maximum area of the flattened electrode group" means a surface whose area can be represented by a product between the length in the longitudinal direction of the electrode group and the length in the direction perpendicular to the longitudinal direction of the electrode group.

In these electrode groups, the positive electrode, the negative electrode and the separator are preferably made into an integral body. The integration of these positive electrode, negative electrode and separator can be performed in the following methods (I) or (II).

(I) An adhesive polymer is interposed at least partially between the positive electrode and the separator, thereby bonding the positive electrode to the separator, and at the same time, the adhesive polymer is interposed at least partially between the negative electrode and the separator, thereby bonding the negative electrode to the separator. Specifically, this integration can be performed by a method wherein the electrode group is placed inside the jacket, and then, a solution of the adhesive polymer is injected into the jacket, after which the resultant body is hot-molded in an atmosphere of reduced pressure, and a liquid nonaqueous electrolyte is allowed to penetrate into the electrode group. Thereafter, the resultant body is subjected to a sealing treatment such as a heat sealing under a reduced pressure of not more than 50 Torr.

(II) A binder contained in the positive electrode and negative electrode is allowed to thermally cure, thereby integrating the positive electrode, negative electrode and separator. Specifically, this integration can be performed for example by a method wherein the electrode group is placed inside the jacket, and then, hot-molded in an atmosphere of reduced pressure, thereby thermally curing the binder contained in the positive electrode and negative electrode so as to make the positive electrode, negative electrode and separator into an integrated body. after which a liquid nonaqueous electrolyte is allowed to penetrate into the electrode group. Thereafter, the resultant body is subjected to a sealing treatment such as a heat sealing under a reduced pressure of not more than 50 Torr.

The adhesive polymer to be employed in the above method (I) should preferably be one which is capable of retaining a high adhesivity while allowing a nonaqueous electrolyte to be retained in the polymer. More preferably, this polymer is high in lithium ion conductivity. Specific examples of such an adhesive polymer may be the same as explained in the aforementioned first nonaqueous electrolyte secondary battery.

The total quantity of the adhesive polymer contained in the secondary battery (including the adhesive polymer contained in the adhesive portion described later) should preferably be confined to the range of 0.1 to 6 mg per 100 mAh of battery capacity, because of the reasons explained with reference to the first nonaqueous electrolyte secondary battery. A more preferable total quantity of the adhesive polymer would be in the range of 0.2 to 1 mg per 100 mAh of battery capacity.

Next, a thin lithium ion secondary battery representing the second nonaqueous electrolyte secondary battery according to this invention will be explained with reference to FIGS. 8 to 10.

Figure 8:
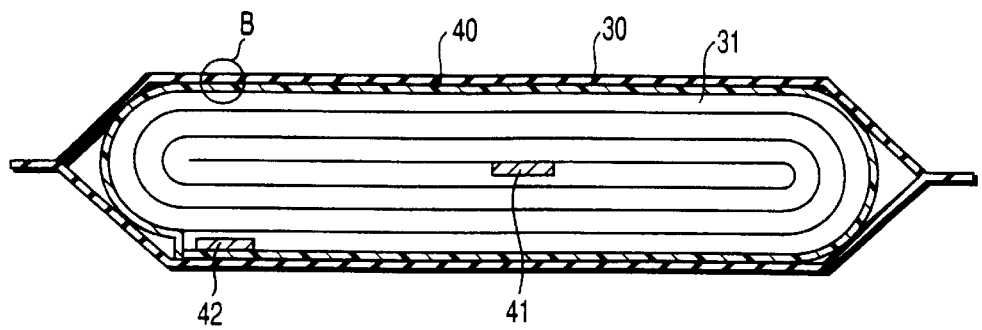
FIG. 8 is a cross-sectional view showing a thin lithium ion secondary battery representing one example of a second nonaqueous electrolyte secondary battery according to this invention.
Figure 9:
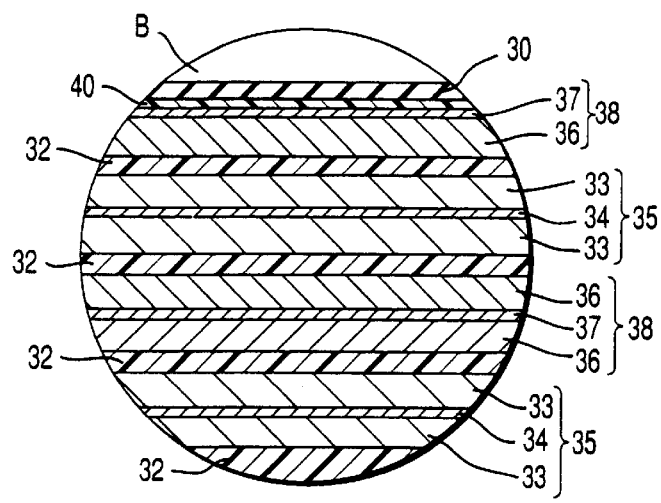
FIG. 9 is an enlarged cross-sectional view showing the portion B shown in FIG. 8.

FIG. 8 is a cross-sectional view showing a thin lithium ion secondary battery representing one example of the second nonaqueous electrolyte secondary battery according to this invention; FIG. 9 is an enlarged cross-sectional view showing the portion B shown in FIG. 8; and FIG. 10 is a perspective view showing the electrode group to be positioned in the lithium ion secondary battery shown in FIG. 8.

An electrode group 31 is housed inside a jacket 30 consisting a multi-layer sheet for instance. This electrode group 31 has a structure wherein a laminate body consisting of a positive electrode, a separator and a negative electrode is spirally wound and flattened, forming an oblong cross-sectional configuration. This laminate body comprises, mentioning from the bottom side thereof shown in FIG. 9, a separator 32; a negative electrode 35 having a negative electrode layer 33, a negative electrode collector 34 and another negative electrode layer 33; a separator 32; a positive electrode 38 having a positive electrode layer 36, a positive electrode collector 37 and another positive electrode layer 36; the separator 32; a negative electrode 35 having a negative electrode layer 33, a negative electrode collector 34 and another negative electrode layer 33; the separator 32; the positive electrode 38 having the positive electrode layer 36 and the positive electrode collector 37; which are laminated in the mentioned order. The outermost periphery of the electrode group 31 is the positive electrode collector 37. Therefore, a couple of surfaces 39 having a maximum area among the surfaces of the electrode group 31 are occupied by the positive electrode collector 37. Herein, the expression of "the surface having a maximum area of the flattened electrode group" means a surface whose area can be represented by a product between the length $L_1$ in the longitudinal direction of the electrode group and the length $L_2$ in the direction perpendicular to the longitudinal direction of the electrode group.

A adhesive layer 40 is interposed between the surface of the electrode group 31 and the inner surface of the jacket 30. A nonaqueous electrolyte is contained inside the jacket 30. A strip-like positive electrode lead 41 is connected at one end thereof with the positive electrode collector 37 of the electrode group 31, the other end of the positive electrode lead 41 being extended from the jacket 30. On the other hand, a strip-like negative electrode lead 42 is connected at one end thereof with the negative electrode collector 34 of the electrode group 31, the other end of the negative electrode lead 42 being extended from the jacket 30.

The electrode group 31 should be dimensioned such that the thickness T thereof is not more than 4 mm, and that the ratio of the longitudinal length to the breadth of the electrode group as calculated by the following formula (1) is 1.2 or more;

$$L_1/L_2 \qquad (1)$$

wherein $L_1$ is the length in the longitudinal direction of the electrode group 31, and $L_2$ is the length perpendicular to the longitudinal direction of the electrode group 31.

Figure 10:
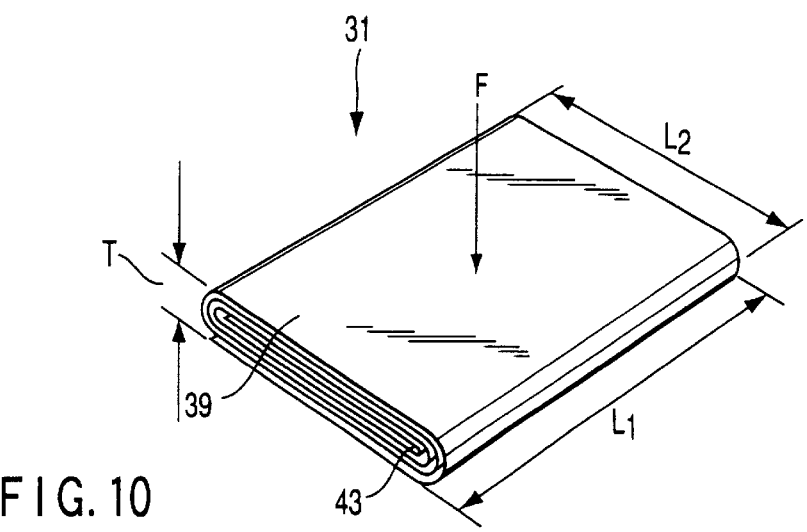
FIG. 10 is a perspective view illustrating one example of the electrode group to be incorporated in the thin lithium ion secondary battery shown in FIG. 8.

The thickness T of the electrode group 31 herein means a thickness which has been measured by a method wherein a load F of 15 to 20 g/cm$^2$ is applied to the surface having a maximum area among the surfaces of the electrode group 31 as shown in FIG. 10.

If the thickness T of the electrode group 31 is larger than 4 mm, or if the ratio $L_1/L_2$ is smaller than 1.2, the surface area of the electrode group would become smaller as compared with an electrode group where the thickness T is 4 mm or less and the ratio $L_1/L_2$ is not less than 1.2 provided that the total volume of the electrode group is assumed as being the same, thereby making it impossible to rapidly disperse the heat from the surface of the electrode group. Therefore, a preferable upper limit of the thickness T is 3.5 mm. Further, the upper limit of the ratio $L_1/L_2$ is preferably 10, more preferably 5.

Figure 11:
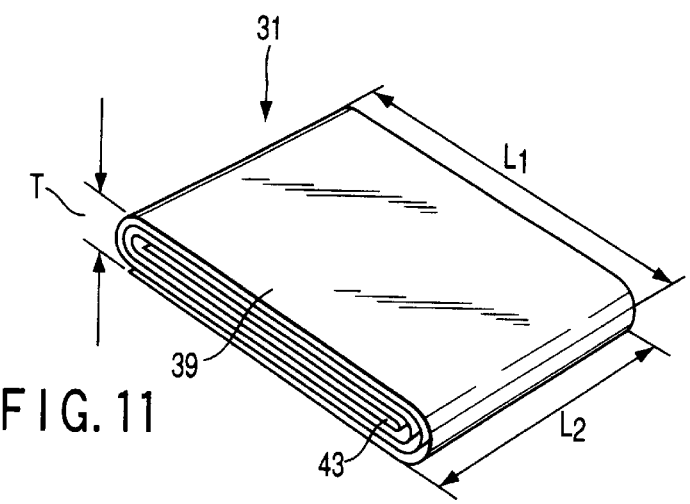
FIG. 11 is a perspective view illustrating another example of the electrode group to be incorporated in the thin lithium ion secondary battery shown in FIG. 8.

In FIG. 10, the laminate structure of the electrode group 31 was allowed to expose from the sides 43 of the electrode group 31 which are perpendicular to the longitudinal direction thereof. However, it is also possible to expose the laminate structure of the electrode group from the sides 43 in the longitudinal direction of the electrode group 31 as shown in FIG. 11. When the laminate structure of the electrode group is exposed at the sides 43 in the longitudinal direction of the electrode group 31, the ratio of the laminated surface in relative to the entire surface of the electrode group can be increased, thus promoting the heat radiation of the electrode group.

Although the adhesive layer 40 is formed all over the surface of the electrode group 31 in the embodiment shown in FIG. 8, the adhesive layer 40 may be formed partially on surface of the electrode group 31. If the adhesive layer 40 is to be formed partially on surface of the electrode group 31, the adhesive layer 40 should preferably be formed at least on the surface corresponding to the outermost periphery of the electrode group. Alternatively, the adhesive layer 40 may be omitted.

In the case of the embodiment shown in FIG. 10, there is explained an electrode group which is produced at first by spirally winding the positive electrodes and the negative electrodes with the separator being interposed therebetween, and then, by compressing the resultant wound body in the radial direction thereof. However, it is also possible to apply this invention to an electrode group having a laminate body which comprises the positive electrode, the negative electrode and the separator which is interposed between the positive electrode and the negative electrode; or to an electrode group wherein a laminate body which comprises the positive electrode, the negative electrode and the separator interposed between the positive electrode and the negative electrode is folded once, or is repeatedly folded.

Figure 12:
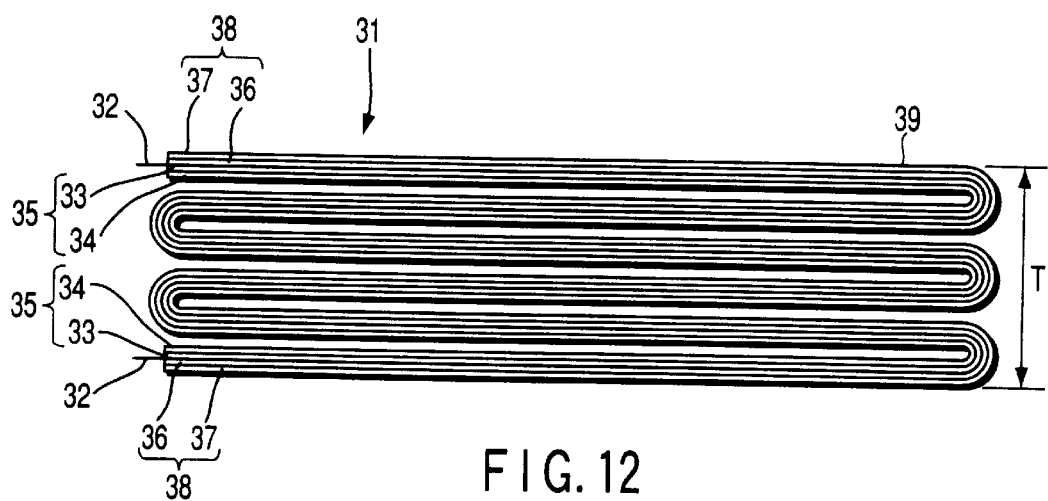
FIG. 12 is a cross-sectional view illustrating still another example of the electrode group to be incorporated in the thin lithium ion secondary battery shown in FIG. 8.

FIG. 12 shows one example of such a folded structure. Referring to FIG. 12, the electrode group 31 is formed in such a manner that a laminate body comprising a positive electrode collector 37, a positive electrode layer 36, a separator 32, a negative electrode layer 33 and a negative electrode collector 34 is repeatedly folded (five times) to obtain the electrode group 31. The outermost layer of the electrode group 31 is the positive electrode collector 37. Therefore, the surface having a maximum area among the surfaces of the electrode group 31 is occupied by the positive electrode collector 37. By the way, if a laminate body which comprises the positive electrode, the negative electrode and the separator interposed between the positive electrode and the negative electrode is to be employed as an electrode group, it is only required that at least one of the outermost layers of the laminate body is the positive electrode collector.

This second nonaqueous electrolyte secondary battery according to this invention comprises an electrode group of flattened configuration which is composed of a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, at least one of which is occupied by a positive electrode collector. As for the jacket, the aforementioned jacket A having a thickness of not more than 0.3 mm or jacket B being made of a sheet having a thickness of not more than 0.5 mm and including a resin layer can be employed.

According to this secondary battery, it is possible to prevent an excessive rise in temperature of the battery even when the battery is abnormally heated due to the throwing of it into a fire, or due to the internal short-circuit or to an increase of internal impedance, thereby making it possible to prevent the explosion or ignition of the battery.

Namely, since a secondary battery including a liquid nonaqueous electrolyte is high in energy density, if abnormal heating is applied to or abnormal heat generation is generated in the secondary battery, the self-heat generation would be promoted due to the chemical reaction inside the battery, thereby causing a rise in temperature of battery. As a result, gas is generated in the secondary battery, thereby causing a leakage, explosion or ignition.

By the way, since an increased thinning and lightening is desired in the secondary battery including the aforementioned jacket A or jacket B, it is undesirable to mount a hardware mechanism for enhancing the safety of battery such as a PTC element (positive temperature coefficient element). However, if the battery does not include a safely mechanism, the probability of risk related to the overcharging or short-circuit would be increased.

Generally, the self-heat generation to be brought about due to the chemical reaction inside the battery that might be caused by an abnormal heating or heat generation is most frequently initiated from the reaction of the positive electrode. Therefore, it is conceivable that the heat radiation property of battery at the initiation of chemical reaction originating from the positive electrode would influence greatly on the safety of the battery. Whereas, in the case of this invention, at least one of the couple of maximum areas of the electrode group is occupied by a positive electrode collector, the positive electrode which is prone to cause the self-heat generation can be rapidly cooled down, thereby enabling to inhibit the rise in temperature of the electrode group that might be caused due to abnormal heating or heat generation.

As a result, it is possible to prevent the explosion or ignition of the battery that might be brought about by an abnormal heating or heat generation due to the throwing of battery into fire, or the short-circuit or over-charging of the battery, thereby making it possible to improve the safety of the battery.

When the laminate structure consisting of the positive electrode, negative electrode and separator is exposed through the sides thereof parallel with the longitudinal direction of the electrode group, the ratio of the laminated surface in relative to the entire surface of the electrode group can be increased, thus promoting the heat radiation of the electrode group, and enabling to inhibit the rise in temperature of the electrode group that might be caused due to abnormal heating or heat generation.

When the thickness of the electrode group is confined to 4 mm or less, and at the same time, when the ratio $L_1/L_2$ is confined to 1.2 or more in this second nonaqueous electrolyte secondary battery of this invention, the surface area of the electrode group can be made larger as compared with an electrode group which has the same volume and does not meet the aforementioned conditions. As a result, it is now possible to promote the heat radiation of the electrode group and to effectively inhibit the rise in temperature of the electrode group that might be caused due to abnormal heating or heat generation.

When a liquid nonaqueous electrolyte including a nonaqueous solvent containing 20 to 80% by volume of γ-butyrolactone is employed in this second nonaqueous electrolyte secondary battery of this invention, the oxidative decomposition of the nonaqueous electrolyte can be suppressed, and at the same time, the generation of gas can be minimized even when the temperature of the battery is increased due to an abnormal exothermic heat, thereby making it possible to inhibit the jacket from swelling and to improve the safety of the battery.

Next, the third nonaqueous electrolyte secondary battery according to this invention will be explained.

The third nonaqueous electrolyte secondary battery according to this invention comprises an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, both of which are occupied by the separator. As for the jacket, the aforementioned jacket A or jacket B can be employed. As for the positive electrode, negative electrode, separator and the liquid nonaqueous electrolyte, the same kind of materials as explained in the aforementioned second nonaqueous electrolyte secondary battery can be employed.

This flattened electrode group can be manufactured in the same manner as explained in the aforementioned second nonaqueous electrolyte secondary battery.

Herein, the expression of "the surface having a maximum area of the flattened electrode group" means a surface whose area can be represented by a product between the length in the longitudinal direction of the electrode group and the length in the direction perpendicular to the longitudinal direction of the electrode group.

The positive electrode, negative electrode and separator in this electrode group should preferably be integrated with each other. The integration thereof can be performed in the same manner as explained in the aforementioned second nonaqueous electrolyte secondary battery.

Next, a thin lithium ion secondary battery representing the third nonaqueous electrolyte secondary battery according to this invention will be explained with reference to FIG. 13.

Figure 13:
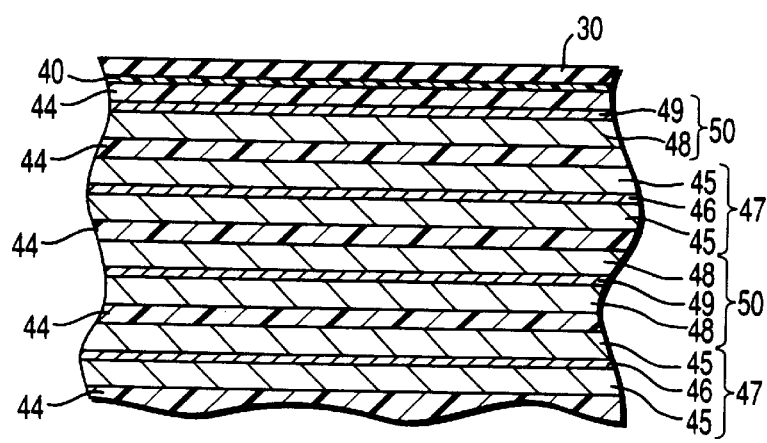
FIG. 13 is an enlarged cross-sectional view showing a main portion of a third nonaqueous electrolyte secondary battery according to this invention.

FIG. 13 is an enlarged cross-sectional view showing a main portion of this third nonaqueous electrolyte secondary battery according to this invention.

This thin lithium ion secondary battery representing one embodiment of the third nonaqueous electrolyte secondary battery is constructed in the same manner as explained with reference to FIG. 8 except that the laminate structure of the electrode group is altered.

This electrode group has a structure wherein a laminate body consisting of a positive electrode, a separator and a negative electrode is spirally wound and flattened, forming an oblong cross-sectional configuration. This laminate body comprises, mentioning from the bottom side thereof shown in FIG. 13, a separator 44; a negative electrode 47 having a negative electrode layer 45, a negative electrode collector 46 and another negative electrode layer 45; a separator 44; a positive electrode 50 having a positive electrode layer 48, a positive electrode collector 49 and another positive electrode layer 48; the separator 44; the negative electrode 47 having the negative electrode layer 45, the negative electrode collector 46 and the negative electrode layer 45; the separator 44; the positive electrode 50 having the positive electrode layer 48 and the positive electrode collector 49; the separator 44; which are laminated in the mentioned order. The outermost periphery of the electrode group is the separator 44. Therefore, a couple of surfaces having a maximum area among the surfaces of the electrode group 31 are occupied by the separator 44. Herein, the expression of "the surface having a maximum area of the flattened electrode group" means a surface whose area can be represented by a product between the length $L_1$ in the longitudinal direction of the electrode group and the length $L_2$ in the direction perpendicular to the longitudinal direction of the electrode group.

Although the positive electrode collector 49 is positioned to contact with the inner side of the separator which is disposed on the outermost periphery of the electrode group in the embodiment shown in FIG. 13, a negative electrode collector may be substituted for this positive electrode collector 49.

Although the adhesive layer 40 is formed all over the surface of the electrode group in the embodiment shown in FIG. 13, the adhesive layer 40 may be formed partially on surface of the electrode group. If the adhesive layer 40 is to be formed partially on surface of the electrode group, the adhesive layer 40 should preferably be formed at least on the surface corresponding to the outermost periphery of the electrode group. Alternatively, the adhesive layer 40 may be omitted.

In the case of the embodiment shown in FIG. 13, there is explained an electrode group which is produced at first by spirally winding the positive electrodes and the negative electrodes with the separator being interposed therebetween, and then, by compressing the resultant wound body in the radial direction thereof. However, it is also possible to apply this invention to an electrode group having a laminate body which comprises the positive electrode, the negative electrode and the separator which is interposed between the positive electrode and the negative electrode; or to an electrode group wherein a laminate body which comprises the positive electrode, the negative electrode and the separator interposed between the positive electrode and the negative electrode is folded once, or is repeatedly folded.

FIG. 14 shows one example of such a folded structure. Referring to FIG. 14, the electrode group has a laminate body comprising a positive electrode 50, a negative electrode 47 and a separator 44 which is interposed between the positive electrode 50 and the negative electrode 47. The outermost layer of the electrode group is occupied by the separator 44.

This third nonaqueous electrolyte secondary battery according to this invention comprises an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, both of which are occupied by a separator. As for the jacket, the aforementioned jacket A having a thickness of not more than 0.3 mm or jacket B being made of a sheet having a thickness of not more than 0.5 mm and including a resin layer can be employed.

A nonaqueous electrolyte secondary battery including the jacket A or the jacket B is poor in mechanical strength, so that when it receives a shock as it is dropped for instance, it can be easily damaged or suffered from a short-circuit.

Whereas according to this invention, since the mechanical strength of the electrode group can be enhanced, it is possible to avoid the damage or short-circuit of the electrode group even if a shock is given to the secondary battery, for instance, when the secondary battery is erroneously dropped. Further, it is also possible to alleviate a shock to the electrode group that may be given thereto in the manufacture thereof, i.e. when the electrode group is compressed in the radial direction thereof after the electrode group is fabricated through the spiral winding of a positive electrode and a negative electrode which a separator being interposed therebetween. As a result, it is possible to avoid a damage of the electrode group in this compressing process. Furthermore, since the shock resistance of the electrode group itself can be enhanced, even if a jacket having a resin layer is employed, the thickness of the resin layer to be contacted with the electrode group can be reduced to 15 $\mu$m or less. More preferably, the resin layer may be omitted.

Next, the fourth nonaqueous electrolyte secondary battery according to this invention will be explained.

The fourth nonaqueous electrolyte secondary battery according to this invention comprises an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, and an insulating protective sheet is disposed to bridge the couple of maximum areas. As for the jacket, the aforementioned jacket A or jacket B can be employed.

As for the positive electrode, negative electrode, separator and the liquid nonaqueous electrolyte, the same kind of materials as explained in the aforementioned second nonaqueous electrolyte secondary battery can be employed.

This flattened electrode group can be manufactured in the same manner as explained in the aforementioned second nonaqueous electrolyte secondary battery.

Herein, the expression of "the surface having a maximum area of the flattened electrode group" means a surface whose area can be represented by a product between the length in the longitudinal direction of the electrode group and the length in the direction perpendicular to the longitudinal direction of the electrode group.

The positive electrode, negative electrode and separator in this electrode group should preferably be integrated with each other. The integration thereof can be performed in the same manner as explained in the aforementioned second nonaqueous electrolyte secondary battery. In the case of the electrode group of flattened configuration that can be obtained in aforementioned method (1), (2) or (4), it is preferable to dispose the insulating protective sheet so as not to extend to cover the exposed sides of the laminate structure of the electrode group. Because, if the insulating protective sheet is extended to cover the exposed sides of the laminate structure, it may become difficult to impregnate the electrode group with the liquid nonaqueous electrolyte.

As for the materials for the insulating protective sheet, an organic polymer which is insoluble to the liquid nonaqueous electrolyte can be preferably employed. Specific examples of such materials are at least one kind selected from the group consisting of polyimide resin, fluororesin and polyolefin resin. As for polyimide resin, Kapton (trademark, duPont Co., Ltd.) can be employed for instance. As for polyolefin resin, polyethylene or polypropylene can be employed for instance. As for fluororesin, polyvinylidene fluoride (PVdF) can be employed for instance.

This insulating protective sheet may be in the form of a non-woven fabric or film. Further, it is possible, through the employment of a porous insulating protective sheet, to enhance the permeability of electrolyte into the electrode group. Furthermore, an adhesive may be interposed between the insulating protective sheet and the electrode group.

The insulating protective sheet should preferably be disposed in such a manner that it bridges the couple of maximum areas and that both ends thereof are contacted with each other or separated from each other by a desired distance. When the insulating protective sheet is disposed in such a manner that it bridges the couple of maximum areas and that both ends thereof are overlapped with each other, the expansion and shrinkage of the electrode group on the occasion of charge/discharge reaction would obstructed, thus giving rise to a distortion in the electrode group and hence, to the generation of fold in the electrode group in course of the repetition of charge/discharge cycle, thereby making it impossible to obtain an excellent cycle life.

Therefore, the distance between both ends of the insulating protective sheet should preferably be adjusted to meet the following formula (2).

$$0 \leq X \leq 0.4 \times L_3 \qquad (2)$$

wherein $L_3$ represents, as shown in FIG. 15 to be illustrated hereinafter, a length as measured along the revolving direction of the insulating protective sheet among the length $L_1$ in the longitudinal direction of the electrode group and the length $L_2$ in the direction perpendicular to the longitudinal direction of the electrode group. By the way, when both ends of the insulating protective sheet are contacted with each other, the distance X becomes zero. When the distance X becomes zero, the electrode-manufacturing operation would become complicated to thereby increase the manufacturing cost thereof.

If the distance X becomes larger than $0.4 \times L_3$, it may become difficult to avoid the damage or short-circuit of the electrode group when a shock is given to the secondary battery, for instance, when the secondary battery is erroneously dropped. Therefore, it would be more preferable to adjust the distance X between both ends of the insulating protective sheet so as to meet the following formula (3).

$$0 \leq X \leq 0.3 \times L_3 \qquad (3)$$

Preferably, the width of the insulating protective sheet should be set shorter than the length of the electrode group. If the width of the insulating protective sheet is identical with or larger than the length, it may become difficult to uniformly penetrate the nonaqueous electrolyte throughout the electrode group. By the way, the width of the insulating protective sheet is a length in the direction perpendicular to the revolving direction of the insulating protective sheet.

The thickness of the insulating protective sheet should preferably be confined to 0.5 mm or less. Because, if the thickness of the insulating protective sheet exceeds over 0.5 mm, the expansion and shrinkage of the electrode group on the occasion of charge/discharge reaction would obstructed, thus giving rise to the generation of fold in the electrode group in course of the repetition of charge/discharge cycle, thereby making it impossible to obtain an excellent cycle life. On the other hand, if the thickness of the insulating protective sheet is less than 0.05 mm, it may become difficult to avoid the damage or short-circuit of the electrode group when a shock is given to the secondary battery, for instance, when the secondary battery is erroneously dropped. Therefore, it would be more preferable to adjust the thickness of the insulating protective sheet to not more than 0.25 mm, more preferably in the range of 0.05 to 0.2 mm, most preferably in the range of 0.05 to 0.15 mm.

Next, a thin lithium ion secondary battery representing the fourth nonaqueous electrolyte secondary battery according to this invention will be explained with reference to FIGS. 15 and 16.

FIG. 15 is a schematical view illustrating an electrode group to be incorporated in a fourth nonaqueous electrolyte secondary battery according to this invention; and FIG. 16 is an enlarged cross-sectional view showing the portion C shown in FIG. 15.

This thin lithium ion secondary battery representing one embodiment of the fourth nonaqueous electrolyte secondary battery is constructed in the same manner as explained with reference to FIG. 8 except that the structure of electrode group is altered.

As seen from the perspective view of an upper portion of FIG. 15, this electrode group 51 has a structure wherein a laminate body consisting of a positive electrode, a separator and a negative electrode is spirally wound and flattened, forming an oblong cross-sectional configuration. The cross-section of the electrode group is shown in a lower portion of FIG. 15. As seen from FIG. 16 showing the portion C of FIG. 15, this laminate body comprises, mentioning from the bottom side thereof shown in FIG. 16, a separator 52; a negative electrode 55 having a negative electrode layer 53, a negative electrode collector 54 and another negative electrode layer 53; a separator 52; a positive electrode 58 having a positive electrode layer 56, a positive electrode collector 57 and another positive electrode layer 56; the separator 52; the negative electrode 55 having the negative electrode layer 53, the negative electrode collector 54 and the negative electrode layer 53; the separator 52; the positive electrode 58 having the positive electrode layer 56 and the positive electrode collector 57; the separator 52; which are laminated in the mentioned order. A rectangular insulating protective sheet 59 covers a portion of the outermost periphery of the electrode group 51 to bridge the couple of maximum areas, the both ends 60a and 60b of the insulating protective sheet 59 are not contacted with each other but are spaced apart. Herein, the expression of "the surface having a maximum area of the flattened electrode group" means a surface whose area can be represented by a product between the length $L_1$ in the longitudinal direction of the electrode group and the length $L_2$ in the direction perpendicular to the longitudinal direction of the electrode group. The distance X between both ends 60a and 60b of the insulating protective sheet is adjusted to meet the aforementioned formula (2): $0 \leq X \leq 0.4 \times L_3$. $L_3$ represents, as shown in FIG. 15, a length as measured along the revolving direction of the insulating protective sheet among the length $L_1$ in the longitudinal direction of the flattened electrode group and the length $L_2$ in the direction perpendicular to the longitudinal direction of the electrode group. In this case, $L_3$ represents $L_2$. The width H of the insulating protective sheet 59 is shorter than the length $L_1$ in the longitudinal direction of the electrode group.

Although the separator 52 is positioned to contact with the inner side of the insulating protective sheet 59 in the embodiment shown in FIG. 15, a positive electrode collector or a negative electrode collector may be substituted for this separator 52.

In the case of the embodiment shown in FIG. 15, there is explained an electrode group which is produced at first by spirally winding the positive electrodes and the negative electrodes with the separator being interposed therebetween, and then, by compressing the resultant wound body in the radial direction thereof. However, it is also possible to apply this invention to an electrode group having a laminate body which comprises the positive electrode, the negative electrode and the separator which is interposed between the positive electrode and the negative electrode; or to an electrode group wherein a laminate body which comprises the positive electrode, the negative electrode and the separator interposed between the positive electrode and the negative electrode is folded once, or is repeatedly folded.

This fourth nonaqueous electrolyte secondary battery according to this invention comprises an electrode group of flattened configuration which comprises a positive electrode, a negative electrode, and a separator interposed between the positive electrode and the negative electrode; a liquid nonaqueous electrolyte impregnated in the electrode group; and a jacket housing the electrode group. This secondary battery is featured in that the electrode group has a couple of maximum areas, and an insulating protective sheet is disposed to bridge the couple of maximum areas. As for the jacket, the aforementioned jacket A having a thickness of not more than 0.3 mm or jacket B being made of a sheet having a thickness of not more than 0.5 mm and including a resin layer can be employed.

According to this secondary battery, since the mechanical strength of the electrode group can be enhanced, it is now possible to avoid the damage or short-circuit of the electrode group when a shock is given to the secondary battery, for instance, when the secondary battery is erroneously dropped.

Furthermore, since the shock resistance of the electrode group itself can be enhanced, even if a jacket having a resin layer is employed, the thickness of the resin layer to be contacted with the electrode group can be reduced to 15 $\mu$m or less. More preferably, the resin layer may be omitted.

When the distance X between both ends of the insulating protective sheet is adjusted to meet the value represented by 0.4×$L_3$, or to be lowered than the value on the occasion of forming the insulating protective sheet in a manner to bridge the couple of maximum areas of the electrode group in the fourth nonaqueous electrolyte secondary battery, the following effects (a) to (c) can be realized.

(a) It is possible to avoid the damage or short-circuit of the electrode group when a shock is given to the secondary battery.

(b) Since it is possible to inhibit the distortion of the electrode group that might be caused due to the expansion and shrinkage of the electrode group on the occasion of charge/discharge reaction, thereby making it possible to avoid the generation of fold in the electrode group in course of the repetition of charge/discharge cycle, it is now possible to obtain an excellent charge/discharge cycle life.

(c) The electrode group can be manufactured by a simple process.

This invention will be further explained in detail with reference to the following examples.

EXAMPLE 1

<Preparation of Positive Electrode>

First of all, 90.5% by weight of powdery lithium cobalt oxide ($Li_xCoO_2$; wherein x is $0 \leq x \leq 1$), 2.5% by weight of acetylene black, 3% by weight of graphite, 4% by weight of polyvinylidene fluoride (PVdF), and a solution of N-methyl pyrrolidone (NMP) were mixed together to prepare a slurry. Then, the resultant slurry was coated on the surface of the positive electrode collector made of an aluminum foil having a thickness of 10 μm, and after being dried, was pressed to obtain a positive electrode having a density of 3.0 g/cm³. The positive electrode thus obtained was of a structure wherein a positive layer having a thickness of 48 μm was carried on the both surfaces of the positive electrode collector. By the way, the total thickness of the positive electrode layers were 96 μm.

<Preparation of Negative Electrode>

Mesophase pitch-based carbon fibers were prepared through a heat treatment at a temperature of 3,000° C. as a carbon material. The carbon fibers were 8 μm in fiber diameter, 20 μm in average fiber length and 0.3360 nm in interplanar spacing $d_{002}$. Thereafter, 93% by weight of the powder of carbon material, 7% by weight of polyvinylidene fluoride (PVdF), and a solution of NMP were mixed together to prepare a slurry. Then, the resultant slurry was coated on the surface of the negative electrode collector made of a copper foil having a thickness of 10 μm, and after being dried, was pressed to obtain a negative electrode having a density of 1.35 g/cm³. The negative electrode thus obtained was of a structure wherein a negative layer having a thickness of 45 μm was carried on the both surfaces of the negative electrode collector. By the way, the total thickness of the negative electrode layers were 90 μm.

<Preparation of Electrode Group>

A polyethylene separator having a thickness of 27 μm, a porosity of 50%, and an air permeability of 90 sec./100 cm³ was prepared. The positive electrode and the negative electrode were spirally wound with a separator being interposed therebetween and compressed in the direction of the diameter to form a flattened oblong electrode group having a thickness of 2.7 mm, a width of 30 mm and a height of 50 mm.

<Preparation of Nonaqueous Electrolyte>

Lithium tetrafluoroborate ($LiBF_4$) was dissolved in a mixed solvent composed of ethylene carbonate (EC) and γ-butyrolactone (BL) mixed at a volume ratio of 40:60 in an amount of 1.5 mol./L to prepare a liquid nonaqueous electrolyte.

<Assembling of Battery>

A laminate film having a thickness of 0.1 mm (100 μm) and composed of an aluminum foil, both surfaces thereof being covered by polypropylene film, was formed into a bag, in which the aforementioned electrode group was placed. The resultant bag was put into a holder to press it into a thickness of 2.7 mm. The pressure applied to the electrode group immediately after the insertion of the bag into the holder was 0.5 kg/cm². On the other hand, polyvinylidene fluoride (PVdF) was employed as an adhesive polymer and dissolved in an organic solvent of dimethyl formamide (DMF) having a boiling point of 153° C. to obtain a 0.3 wt. % solution. The solution thus obtained was injected into the electrode group disposed inside the laminate film in an amount of 0.6 mL per 100 mAh of battery capacity. Thus, the solution was allowed to penetrate the inner region of the electrode group, and at the same time, to be attached to the entire surface of the electrode group.

Then, the electrode group disposed inside the laminate film was subjected to vacuum drying at a temperature of 80° C. for 12 hours, thereby allowing the organic solvent to evaporate and hence, allowing the adhesive polymer to be retained in voids of the positive electrode, negative electrode and separator so as to make the positive electrode, negative electrode and separator into an integral body, and at the same time, to form a porous adhesive portion on the surface of the electrode group.

Thereafter, the holder was loosened. The total time in which the electrode group was sandwiched by means of the holder was 120 minutes. Then, 2 g of the nonaqueous electrolyte was injected into the electrode group disposed inside the laminate film to thereby assemble a thin nonaqueous electrolyte secondary battery having a structure shown in FIGS. 3 and 4, a thickness of 2.7 mm, a width of 32 mm and a height of 55 mm.

EXAMPLE 2

An electrode group was manufactured in the same manner as explained in the aforementioned Example 1. Then, the electrode group was placed inside the laminate film of the same kind as explained in Example 1. Thereafter, a solution of an adhesive polymer in an organic solvent was injected into the inside of the laminate film.

Then, the electrode group was subjected to a pressing of 0.1 kg/cm² in the direction of thickness of the electrode group at a temperature of 80° C. for 60 minutes, thereby allowing the positive electrode, negative electrode and separator to be integrated by the adhesive polymer, and at the same time, causing a porous adhesive portion to be formed on the surface of the electrode group.

Thereafter, the nonaqueous electrolyte of the same kind as explained in Example 1 was injected into the electrode group disposed inside the laminate film to thereby assemble a thin nonaqueous electrolyte secondary battery having a structure shown in FIGS. 3 and 4, a thickness of 2.7 mm, a width of 32 mm and a height of 55 mm.

EXAMPLE 3

An electrode group was manufactured in the same manner as explained in the aforementioned Example 1. Then, the electrode group was placed inside the laminate film of the same kind as explained in Example 1.

Then, the electrode group was subjected to a pressing of 0.1 kg/cm² in the direction of thickness of the electrode group at a temperature of 80° C. for 60 minutes, thereby allowing the positive electrode, negative electrode and separator to be integrated.

Thereafter, the nonaqueous electrolyte of the same kind as explained in Example 1 was injected into the electrode group disposed inside the laminate film to thereby assemble a thin nonaqueous electrolyte secondary battery having a structure shown in FIGS. 3 and 4, a thickness of 2.7 mm, a width of 32 mm and a height of 55 mm.

EXAMPLE 4

A thin nonaqueous electrolyte secondary battery was assembled in the same manner as explained in Example 3 except that the pressure in the press molding was set to 10 kg/cm$^2$ and the pressing time was set to 5 minutes.

EXAMPLE 5

A thin nonaqueous electrolyte secondary battery was assembled in the same manner as explained in Example 1 except that the electrode group was sandwiched in such a manner that the pressure applied to the electrode group immediately after the insertion thereof into the holder was set to 0.1 kg/cm$^2$, and that the molding time was set to 120 minutes.

EXAMPLE 6

An electrode group was manufactured in the same manner as explained in the aforementioned Example 1. Then, the electrode group was placed inside the laminate film of the same kind as explained in Example 1.

Then, the electrode group was sandwiched by making use of a holder for 120 minutes in a vacuum atmosphere and at a temperature of 80° C. so as to reduce the thickness of the battery to 2.68 mm, thereby making the positive electrode, negative electrode and separator into an integral body. By the way, the pressure applied to the electrode group immediately after the insertion thereof into the holder was set to 0.1 kg/cm$^2$.

Thereafter, the nonaqueous electrolyte of the same kind as explained in Example 1 was injected into the electrode group disposed inside the laminate film to thereby assemble a thin nonaqueous electrolyte secondary battery having a structure shown in FIGS. 3 and 4, a thickness of 2.7 mm, a width of 32 mm and a height of 55 mm.

EXAMPLE 7

A thin nonaqueous electrolyte secondary battery was assembled in the same manner as explained in Example 1 except that the air permeability of the separator was set to 30 sec./100 cm$^3$, and that the mixing ratio of the γ-butyrolactone in the nonaqueous solvent was set to 20% by volume.

EXAMPLE 8

A thin nonaqueous electrolyte secondary battery was assembled in the same manner as explained in Example 1 except that the air permeability of the separator was set to 90 sec./100 cm$^3$, and that the mixing ratio of the γ-butyrolactone in the nonaqueous solvent was set to 50% by volume.

EXAMPLE 9

A thin nonaqueous electrolyte secondary battery was assembled in the same manner as explained in Example 1 except that the air permeability of the separator was set to 450 sec./100 cm$^3$, and that the mixing ratio of the γ-butyrolactone in the nonaqueous solvent was set to 80% by volume.

EXAMPLES 10 to 15

A thin nonaqueous electrolyte secondary battery was assembled in the same manner as explained in Example 3 except that the pressure and pressing time in the press molding were altered as shown in the following Table 1.

EXAMPLE 16

A thin nonaqueous electrolyte secondary battery was assembled in the same manner as explained in Example 3 except that lithium tetrafluoroborate (LiBF$_4$) was dissolved in a mixed solvent composed of ethylene carbonate (EC) and propylene carbonate (PC) mixed at a volume ratio of 25:75 in an amount of 1.5 mol./L to prepare a nonaqueous electrolyte.

EXAMPLE 17

A thin nonaqueous electrolyte secondary battery was assembled in the same manner as explained in Example 3 except that lithium tetrafluoroborate (LiBF$_4$) was dissolved in a mixed solvent composed of ethylene carbonate (EC) and propylene carbonate (PC) mixed at a volume ratio of 10:90 in an amount of 1.5 mol./L to prepare a nonaqueous electrolyte.

EXAMPLE 18

A thin nonaqueous electrolyte secondary battery was assembled in the same manner as explained in Example 1 except that a positive electrode manufactured by the following method was employed, and that the pressure and pressing time in the press molding were altered as shown in the following Table 1.

Namely, 90.5% by weight of powdery lithium-containing nickel cobalt oxide having a composition represented by LiCo$_{0.2}$Ni$_{0.8}$O$_2$, 2.5% by weight of acetylene black, 3% by weight of graphite, 4% by weight of polyvinylidene fluoride (PVdF), and a solution of N-methyl pyrrolidone (NMP) were mixed together to prepare a slurry. Then, the resultant slurry was coated on the surface of the positive electrode collector made of an aluminum foil having a thickness of 10 μm, and after being dried, was pressed to obtain a positive electrode having a density of 3.0 g/cm$^3$. The positive electrode thus obtained was of a structure wherein a positive layer having a thickness of 48 μm was carried on the both surfaces of the positive electrode collector. By the way, the total thickness of the positive electrode layers were 96 μm.

EXAMPLE 19

A thin nonaqueous electrolyte secondary battery was assembled in the same manner as explained in Example 3 except that a positive electrode manufactured by the following method was employed, and that the pressure and pressing time in the press molding were altered as shown in the following Table 1.

Namely, 90.5% by weight of powdery lithium-containing nickel cobalt oxide having a composition represented by LiCo$_{0.2}$Ni$_{0.8}$O$_2$, 2.5% by weight of acetylene black, 3% by weight of graphite, 4% by weight of polyvinylidene fluoride (PVdF), and a solution of N-methyl pyrrolidone (NMP) were mixed together to prepare a slurry. Then, the resultant slurry was coated on the surface of the positive electrode collector made of an aluminum foil having a thickness of 10 μm, and after being dried, was pressed to obtain a positive electrode having a density of 3.0 g/cm$^3$. The positive electrode thus obtained was of a structure wherein a positive layer having a thickness of 48 μm was carried on the both surfaces of the positive electrode collector. By the way, the total thickness of the positive electrode layers were 96 μm.

EXAMPLE 20

A thin nonaqueous electrolyte secondary battery was assembled in the same manner as explained in Example 3 except that a carbon material prepared by the following method was employed.

Namely, the mixture consisting of 60% by weight of mesophase pitch-based carbon fibers which were prepared through a heat treatment at a temperature of 3,000° C. and 40% by weight of mesophase globules which were prepared through a heat treatment at a temperature of 3,000° C. was prepared as a carbon material. The carbon fibers were 8 μm in average fiber diameter, 20 μm in average fiber length, 2.5 in average aspect ratio and 0.3360 nm in interplanar spacing $d_{002}$. The mesophase globules were 6 μm in average particle size, 0.95 in ratio of the minor radius to the major radius and 0.3361 nm in interplanar spacing $d_{002}$.

EXAMPLE 21

A thin nonaqueous electrolyte secondary battery was assembled in the same manner as explained in Example 3 except that a carbon material prepared by the following method was employed.

Namely, the mixture consisting of 50% by weight of mesophase pitch-based carbon fibers which were prepared through a heat treatment at a temperature of 3,000° C. and 50% by weight of granular graphite was prepared as a carbon material. The carbon fibers were 3 μm in average fiber diameter, 15 μm in average fiber length, 5 in average aspect ratio and 0.3362 nm in interplanar spacing $d_{002}$. The granular graphite were 6 μm in average particle size, 5 in ratio of the minor radius to the major radius and 0.3355 nm in interplanar spacing $d_{002}$.

Comparative Example 1

A thin nonaqueous electrolyte secondary battery was assembled in the same manner as explained in Example 1 except that a 5 wt. % solution of PVdF in dimethyl formamide (DMF) was employed as a solution of adhesive polymer.

Comparative Example 2

A 5 wt. % solution of PVdF in dimethyl formamide (DMF) was coated on the surface of the separator of the same kind as explained in Example 1. Then, this separator was interposed between the positive and negative electrodes of the same kinds as explained in Example 1, thereby obtaining an electrode group.

Thereafter, the electrode group was placed inside the same kind of laminate film as explained in Example 1, and then, a nonaqueous electrolyte of the same kind as explained in Example 1 was injected into the electrode group to thereby assemble a thin nonaqueous electrolyte secondary battery having a thickness of 2.7 mm, a width of 32 mm and a height of 55 mm.

Comparative Example 3

A thin nonaqueous electrolyte secondary battery was assembled in the same manner as explained in Comparative Example 2 except that lithium tetrafluoroborate (LiBF$_4$) was dissolved in a mixed solvent composed of ethylene carbonate (EC) and diethyl carbonate (DEC) mixed at a volume ratio of 10:90 in an amount of 1 mol./L to prepare a nonaqueous electrolyte.

Each of the secondary batteries obtained from Examples 1 to 21 and Comparative Examples 1 to 3 was subjected to an initial charge/discharge. Then, the constant-voltage charging with a current of 1 C until 4.2V was performed for 3 hours. Thereafter, these secondary batteries were discharged with a current of 1 C until the voltage thereof was lowered down to 3V to measure the discharge capacity at this moment, the results being determined as the discharge capacity thereof at 1 C. Thereafter, the constant-voltage charging with a current of 1 C until 4.2V was performed for 3 hours, and then, these secondary batteries were again discharged with a current of 3 C until the voltage thereof was lowered down to 3V to measure the discharge capacity at this moment, the results being determined as the discharge capacity thereof at 3 C. The results on the discharge capacity at 3 C in comparison with the discharge capacity at 1 C which is defined as 100% are shown in the following Table 1.

Each of the secondary batteries obtained from Examples 1 to 21 and Comparative Examples 1 to 3 was subjected to a charge/discharge cycle wherein each battery was charged with a current of 1 C, and then, discharged with a current of 1 C. In this experiment, a discharge capacity was determined at the 500th cycle in relative to the discharge capacity of the first cycle which was defined as being 100%. The discharge capacity thus determined was defined as the capacity retention ratio at the 500th cycle, the results being shown in the following Table 1.

Further, each-of the secondary batteries obtained from Examples 1 to 21 was charged up to 4.2V, and then, left to stand for 24 hours at a temperature of 85° C. to measure the swelling thereof after this storage. By the way, the swelling factor is indicated on the basis of the thickness of each battery before the storage thereof.

Further, each of the secondary batteries obtained from Examples 1 to 21 and Comparative Examples 1 to 3 was subjected to the initial charge/discharge, and then, disintegrated to measure, by following method, the peeling strength between the positive electrode layer and the separator, the peeling strength between the positive electrode layer and the positive electrode collector, the negative electrode layer and the separator, and the peeling strength between the negative electrode layer and the negative electrode collector. Namely, the measuring apparatus used was "Rheo meter, type NRM/1010J-CW" (trade name of an apparatus manufactured by Fudo Kogyo K.K.). In the first step, the secondary battery was dismantled to take out the aimed laminate body that held the nonaqueous electrolyte. The laminate body consists of, for example, a negative electrode collector, a negative electrode layer and a separator which are laminated in the mentioned order. The laminate body, which was 20 mm wide and 50 mm long, was disposed on a supporting base such that the collector of the laminate. body was allowed to face downward. Then, a double-sided tape was mounted to the upper surface of the laminate body. The double-sided tape was "Scotch, CAT.NO.665-3-24" (trade name of the tape manufactured by Sumitomo 3M K.K.). A clear film made from a rigid poly vinyl chloride was used as the base material of the double-sided tape. An acrylic resin adhesive was used as the adhesive of the double-sided tape. The contact area between the tape and the laminate body was 20 mm×30 mm. The double-sided tape was pulled in a direction parallel to the upper surface of the laminate body at a pulling rate of 2 cm/min, thereby the separator is peeled off the negative electrode layer. The pulling force is changed during peeling of the separator, reaching a constant pulling force at a certain point of peeling of the separator from the laminate body. The peeling strength between the separator and the negative electrode layer was determined by the constant pulling force. The results of this measurement are shown in the following Table 1.

Additionally, the viscosity (at 20° C.) of the liquid non-aqueous electrolyte of each secondary battery was also measured, the results being shown in the following Table 1.

TABLE 1

|  |  | Ratio of BL or PC (vol %) | Electrolyte viscosity (cp) | Air permeability of separator (sec./100 cm$^3$) | Molding pressure (kg/cm$^2$) | Molding time (min.) | Peeling strength Posi. Electrode/ collector (gf/cm) | Peeling strength Posi. Electrode/ separator (gf/cm) |
|---|---|---|---|---|---|---|---|---|
| Example | 1 | 60 | 6 | 90 | 0.5 | 120 | 15 | 1.7 |
|  | 2 | 60 | 6 | 90 | 0.1 | 120 | 15 | 1.0 |
|  | 3 | 60 | 6 | 90 | 1.0 | 60 | 15 | 0.1 |
|  | 4 | 60 | 6 | 90 | 10 | 5 | 15 | 8.0 |
|  | 5 | 60 | 6 | 90 | 0.1 | 120 | 15 | 1.5 |
|  | 6 | 60 | 6 | 90 | 0.1 | 120 | 15 | 0.1 |
|  | 7 | 20 | 12 | 30 | 0.5 | 120 | 15 | 1.7 |
|  | 8 | 50 | 7 | 90 | 0.5 | 120 | 15 | 1.7 |
|  | 9 | 80 | 5.5 | 450 | 0.5 | 120 | 15 | 1.7 |
|  | 10 | 60 | 6 | 90 | 10 | 3.0 | 15 | 2.0 |
|  | 11 | 60 | 6 | 90 | 10 | 3.0 | 15 | 5.0 |
|  | 12 | 60 | 6 | 90 | 15 | 5.0 | 15 | 10.0 |
|  | 13 | 60 | 6 | 90 | 20 | 1.0 | 15 | 4.0 |
|  | 14 | 60 | 6 | 90 | 20 | 1.5 | 15 | 9.5 |
|  | 15 | 60 | 6 | 90 | 20 | 3.0 | 15 | 14.0 |
|  | 16 | 75 | 7.5 | 90 | 10 | 5.0 | 15 | 8.0 |
|  | 17 | 75 | 7.5 | 90 | 10 | 5.0 | 15 | 8.0 |
|  | 18 | 60 | 6 | 90 | 20 | 5.0 | 8 | 10.0 |
|  | 19 | 60 | 6 | 90 | 20 | 5.0 | 8 | 10.0 |
| Comparative | 1 | 60 | 6 | 90 | 12 | 240 | 15 | 18 |
| Example | 2 | 60 | 6 | 90 | 15 | 240 | 15 | 20 |
|  | 3 | — | 2.5 | 90 | 15 | 240 | 15 | 20 |
| Example | 20 | 60 | 6 | 90 | 1.0 | 60 | 15 | 0.1 |
|  | 21 | 60 | 6 | 90 | 1.0 | 60 | 15 | 0.1 |

|  |  | Peeling strength Nega. Electrode/ collector (gf/cm) | Peeling strength Nega. Electrode/ separator (gf/cm) | 3C discharge capacity retention ratio (%) | Capacity retention ratio of 500th cycle (%) |
|---|---|---|---|---|---|
| Example | 1 | 12 | 0.8 | 90 | 87 |
|  | 2 | 12 | 0.4 | 90 | 80 |
|  | 3 | 12 | 0.05 | 92 | 85 |
|  | 4 | 12 | 4.0 | 85 | 70 |
|  | 5 | 12 | 0.5 | 90 | 85 |
|  | 6 | 12 | 0.01 | 90 | 85 |
|  | 7 | 12 | 0.8 | 50 | 80 |
|  | 8 | 12 | 0.8 | 88 | 90 |
|  | 9 | 12 | 0.8 | 70 | 60 |
|  | 10 | 12 | 1.5 | 85 | 85 |
|  | 11 | 12 | 3.0 | 80 | 85 |
|  | 12 | 12 | 6.0 | 70 | 85 |
|  | 13 | 12 | 2.0 | 85 | 90 |
|  | 14 | 12 | 5.0 | 65 | 85 |
|  | 15 | 12 | 10.0 | 60 | 85 |
|  | 16 | 12 | 4.0 | 50 | 70 |
|  | 17 | 12 | 4.0 | 50 | 70 |
|  | 18 | 13.0 | 5.0 | 80 | 70 |
|  | 19 | 13.0 | 5.0 | 80 | 70 |
| Comparative | 1 | 12 | 15 | 30 | 20 |
| Example | 2 | 12 | 18 | 5 | 10 |
|  | 3 | 12 | 18 | 20 | 10 |
| Example | 20 | 12 | 0.05 | 90 | 89 |
|  | 21 | 12 | 0.05 | 85 | 80 |

As apparent from Table 1, the secondary batteries obtained from Examples 1 to 21 wherein the peeling strength between the negative electrode layer and the separator is lower than the peeling strength between the negative electrode layer and the negative electrode collector were higher in capacity retention ratio on the occasion of the discharging with 3 C and more excellent in capacity retention ratio at the 500th cycle as compared with the secondary batteries obtained from Comparative Examples 1 to 3.

It will be also recognized that the secondary batteries obtained from Examples 1 to 21 were capable of inhibiting the swelling ratio of less than 2% during the high-temperature storage thereof.

EXAMPLE 22

A thin nonaqueous electrolyte secondary battery was obtained as in Example 3, except that thickness of 0.5 mm was used as a jacket and that thickness of the electrode group was decreased to allow the prepared secondary battery to be sized as in Example 3, i.e., 2.7 mm in thickness, 32 mm in width, and 55 mm in height. The battery capacity for Example 20 was 60% in relative to the battery capacity for Example 3 which is defined as 100%.

EXAMPLE 23

<Preparation of Positive Electrode>

First of all, 91% by weight of powdery lithium cobalt oxide (LixCoO$_2$; wherein x is $0 \leq x \leq 1$), 3.5% by weight of acetylene black, 3.5% by weight of graphite, 2% by weight of powdery ethylenepropylene diene monomer, and toluene were mixed together to prepare a slurry. Then, the resultant slurry was coated on the both surfaces of a collector made of a porous aluminum foil having a thickness of 15 μm and having a large number of pores 0.5 mm in diameter which are distributed at a ratio of 10 per 10 cm$^2$. Thereafter, the coated layer was dried and pressed to obtain a positive electrode having a density of 3.0 g/cm$^3$.

<Preparation of Negative Electrode>

Mesophase pitch-based carbon fibers were prepared through a heat treatment at a temperature of 3,000° C. as a carbonaceous material. The carbon fibers were 8 μm in fiber diameter, 20 μm in average fiber length and 0.3360 nm in interplanar spacing d$_{002}$. Thereafter, 93% by weight of the powder of carbon fibers, 7% by weight of polyvinylidene fluoride (PVdF), and a solution of NMP were mixed together to prepare a slurry. Then, the resultant slurry was coated on the both surfaces of a collector made of a porous copper foil having a thickness of 15 μm and having a large number of pores 0.5 mm in diameter which are distributed at a ratio of 10 per 10 cm$^2$. Thereafter, the coated layer was dried and pressed to obtain a negative electrode having a density of 1.3 g/cm$^3$.

<Separator>

A couple of separator each consisting of a polyethylene porous film having a thickness of 25 μm, a heat shrinkage of 20% upon being left to stand at 120° C. for one hour and a porosity of 50% were prepared. The length of each side of the separator was longer than that of each side of the positive electrode by a length of 2 mm, and also longer than that of each side of the negative electrode by a length of 1.5 mm.

<Preparation of Nonaqueous Electrolyte>

Lithium hexafluoro phosphate (LiPF$_6$) was dissolved in a mixed solvent composed of ethylene carbonate (EC) and methylethyl carbonate (MEC) mixed at a volume ratio of 1:2 in an amount of 1 mol./L to prepare a liquid nonaqueous electrolyte.

<Preparation of Electrode Group>

The positive electrode, negative electrode and separator thus obtained were laminated one another in the order of the separator, the positive electrode, the separator and the negative electrode, and then, spirally wound with the outermost layer thereof being the positive electrode collector to obtain a spiral body, which was then compressed in a direction of the diameter to form a flattened oblong electrode group as shown in FIG. 11.

The electrode group thus obtained was 2.9 mm in thickness T as measured by a method explained above with reference to FIG. 10, 250 mm in length L$_1$ in the longitudinal direction thereof, 180 mm in length L$_2$ perpendicular to the longitudinal direction thereof, and 1.39 in the ratio of length (L$_1$/L$_2$) as calculated by making use of the aforementioned formula (1). The laminate structure consisting of the positive electrode, negative electrode and separator was allowed to expose at the end faces in the longitudinal direction of the electrode group. Further, the end portions of the separator were extended further from the ends of the positive electrode by a length of 1 mm, and from the ends of the negative electrode by a length of 0.75 mm.

A laminate film having a thickness of 0.1 mm (100 μm) and composed of an aluminum foil, both surfaces thereof being covered by polypropylene film, was formed into a bag, in which the aforementioned electrode group was placed in such a manner that the laminated surface of the electrode group could be seen through an opening of the bag. On the other hand, polyacrylonitrile (PAN) was employed as an adhesive polymer and dissolved in an organic solvent of dimethyl formamide having a boiling point of 153° C. to obtain a 0.5 wt. % solution. The solution thus obtained was injected into the electrode group disposed inside the laminate film in an amount of 0.25 mL per 100 mAh of battery capacity. Thus, the solution was allowed to penetrate inner region of the electrode group, and at the same time, to be attached to the entire surface of the electrode group.

Then, the electrode group disposed inside the laminate film was subjected to vacuum drying at a temperature of 80° C. for 12 hours, thereby allowing the organic solvent to evaporate and hence, allowing the adhesive polymer to be retained in voids of the positive electrode, negative electrode and separator so as to make the positive electrode, negative electrode and separator into an integral body, and at the same time, to form a porous adhesive portion on the surface of the electrode group. The total quantity of the PAN was 1.25 mg per 100 mAh of battery capacity.

Thereafter, the nonaqueous electrolyte was injected into the electrode group disposed inside the laminate film such that the amount per 1 Ah battery capacity was 4.1 g. Thereafter, the bag was heat-sealed in an atmosphere of reduced pressure of not more than 30 Torr to thereby assemble a thin nonaqueous electrolyte secondary battery having a structure shown in FIGS. 8 and 9.

EXAMPLE 24

A thin nonaqueous electrolyte secondary battery was assembled in the same manner as explained in Example 23 except that the electrode group was dimensioned to become 2.0 mm in thickness T, 300 mm in length L$_1$ in the longitudinal direction thereof, 150 mm in length L$_2$ perpendicular to the longitudinal direction thereof, and 2.0 in the ratio of length (L$_1$/L$_2$) as calculated by making use of the aforementioned formula (1).

EXAMPLE 25

The positive electrode, negative electrode and separator which were similar to those explained in Example 23 were laminated one another in the order of the separator, the positive electrode, the separator and the negative electrode, and then, spirally wound with the outermost layer thereof being the positive electrode collector to obtain a spiral body, which was then compressed in a direction of the diameter to form a flattened oblong electrode group as shown in FIG. 11.

The electrode group thus obtained was 4.0 mm in thickness T as measured by the aforementioned method, 200 mm in length L$_1$ in the longitudinal direction thereof, 135 mm in length L$_2$ perpendicular to the longitudinal direction thereof, and 1.48 in the ratio of length (L$_1$/L$_2$) as calculated by making use of the aforementioned formula (1). The laminate structure consisting of the positive electrode, negative electrode and separator was allowed to expose at the end faces in the longitudinal direction of the electrode group. Further, the end portions of the separator were extended further from the ends of the positive electrode by a length of 1 mm, and from the ends of the negative electrode by a length of 0.75 mm.

Then, the electrode group was placed inside the laminate film of the same kind as explained in Example 23. Thereafter, a press working was applied to the resultant body in the direction of the thickness thereof at a pressure of 15 kg/cm$^2$ and in a vacuum atmosphere at a temperature of 90° C., thereby making the positive electrode, negative electrode and separator into an integral body.

Thereafter, the nonaqueous electrolyte was injected into the electrode group disposed inside the laminate film in the same manner as explained in Example 23. Thereafter, the bag was heat-sealed in an atmosphere of reduced pressure of not more than 30 Torr to thereby assemble a thin nonaqueous electrolyte secondary battery.

EXAMPLE 26

A thin nonaqueous electrolyte secondary battery was assembled in the same manner as explained in Example 25 except that the electrode group was dimensioned to become 1.5 mm in thickness T, 200 mm in length $L_1$ in the longitudinal direction thereof, 50 mm in length $L_2$ perpendicular to the longitudinal direction thereof, and 4.0 in the ratio of length ($L_1/L_2$) as calculated by making use of the aforementioned formula (1).

EXAMPLE 27

The positive electrode, negative electrode and separator which were similar to those explained in Example 23 were laminated one another in such a manner that the separator was interposed between the positive electrode and the negative electrode, and that the outermost layer thereof was the positive electrode collector to obtain a flattened electrode group.

The electrode group thus obtained was 2.9 mm in thickness T as measured by the aforementioned method, 250 mm in length $L_1$ in the longitudinal direction thereof, 180 mm in length $L_2$ perpendicular to the longitudinal direction thereof, and 1.39 in the ratio of length ($L_1/L_2$) as calculated by making use of the aforementioned formula (1). Further, the end portions of the separator were extended further from the ends of the positive electrode by a length of 1 mm, and from the ends of the negative electrode by a length of 0.75 mm.

Then, the electrode group was placed inside the laminate film of the same kind as explained in Example 23. Thereafter, the injection of an adhesive polymer, the vacuum drying, the injection of the nonaqueous electrolyte, and the heat-sealing were performed in the same manner as explained in Example 23 to thereby assemble a thin nonaqueous electrolyte secondary battery.

EXAMPLE 28

A thin nonaqueous electrolyte secondary battery was assembled in the same manner as explained in Example 23 except that the laminate structure consisting of the positive electrode, negative electrode and separator was allowed to expose at the end faces of the electrode group which are perpendicular to the longitudinal direction thereof.

EXAMPLES 29 to 31

A thin nonaqueous electrolyte secondary battery was manufactured in the same manner as explained in Example 23 except that the thickness of the laminate film constituting the jacket was altered as shown in the following Table 2.

EXAMPLE 32

A thin nonaqueous electrolyte secondary battery was assembled in the same manner as explained in Example 23 except that lithium tetrafluoroborate (LiBF$_4$) was dissolved in a mixed solvent composed of ethylene carbonate (EC) and γ-butyrolactone (BL) mixed at a volume ratio of 34:66 in an amount of 1.5 mol./L to prepare a nonaqueous electrolyte.

EXAMPLE 33

A thin nonaqueous electrolyte secondary battery was assembled in the same manner as explained in Example 23 except that lithium tetrafluoroborate (LiBF$_4$) was dissolved in a mixed solvent composed of ethylene carbonate (EC) and γ-butyrolactone (BL) mixed at a volume ratio of 25:75 in an amount of 1.5 mol./L to prepare a nonaqueous electrolyte.

Comparative Example 6

A thin nonaqueous electrolyte secondary battery was assembled in the same manner as explained in Example 23 except that the thickness T of electrode group was altered to 8.0 mm.

Comparative Example 7

A thin nonaqueous electrolyte secondary battery was assembled in the same manner as explained in Example 23 except that the outermost layer of electrode group was a negative electrode collector.

Comparative Example 8

A thin nonaqueous electrolyte secondary battery was assembled in the same manner as explained in Example 23 except that the outermost layer of electrode group was a positive electrode layer.

Comparative Example 9

A thin nonaqueous electrolyte secondary battery was assembled in the same manner as explained in Example 23 except that the thickness of the jacket was altered to 0.6 mm.

Each of the secondary batteries obtained from Examples 23 to 33 and Comparative Examples 6 to 9 was subjected to a charge/discharge cycle, wherein the secondary battery was charged for 5 hours with a charging current of 0.5 C up to a voltage of 4.2V and then, discharged with a current of 0.5 C until the voltage thereof was lowered down to 2.7V to determine the discharge capacity at the 300th cycle in relative to the discharge capacity of the first cycle which was defined as being 100%. The discharge capacity thus determined was defined as the capacity retention ratio at the 300th cycle, the results being shown in the following Table 3.

Each of the secondary batteries obtained from Examples 23 to 33 and Comparative Examples 6 to 9 was left to stand in an oven of 100° C. to monitor the temperature of the outer surface of the laminate film, the results being shown in the following Table 3. By the way, the notice "none" means that no temperature increase was not recognized during the standing of the secondary battery.

Each of the secondary batteries obtained from Examples 23 to 33 and Comparative Examples 6 to 9 was charged up to 4.2V, and then, left to stand for 24 hours at a temperature of 80° C. to measure the swelling thereof after this storage, the results being shown in the following Table 3.

Furthermore, the energy density per unit volume in each of the secondary batteries of Examples 23 to 33 and Comparative Examples 6 to 9 was measured, the results being shown in the following Table 3.

TABLE 2

| | Surface of Max. area | Structure of electrode group | $L_1/L_2$ |
|---|---|---|---|
| Example 23 | Posi. collector | Spriral/Laminate structure exposed along longitudinal direction | 1.39 |
| Example 24 | Posi. collector | Spriral/Laminate structure exposed along longitudinal direction | 2.0 |
| Example 25 | Posi. collector | Spriral/Laminate structure exposed along longitudinal direction | 1.48 |
| Example 26 | Posi. collector | Spriral/Laminate structure exposed along longitudinal direction | 4.0 |
| Example 27 | Posi. collector | Laminate | 1.39 |
| Example 28 | Posi. collector | Spriral/Laminate structure exposed perpendicular to longitudinal direction | 1.39 |
| Example 29 | Posi. collector | Spriral/Laminate structure exposed along longitudinal direction | 1.39 |
| Example 30 | Posi. collector | Spriral/Laminate structure exposed along longitudinal direction | 1.39 |
| Example 31 | Posi. collector | Spriral/Laminate structure exposed along longitudinal direction | 1.39 |
| Example 32 | Posi. collector | Spriral/Laminate structure exposed along longitudinal direction | 1.39 |
| Example 33 | Posi. collector | Spriral/Laminate structure exposed along longitudinal direction | 1.39 |
| Comparative Example 6 | Posi. collector | Spriral/Laminate structure exposed along longitudinal direction | 1.39 |
| Comparative Example 7 | Nega. Collector | Spriral/Laminate structure exposed along longitudinal direction | 1.39 |
| Comparative Example 8 | Posi. electrode layer | Spriral/Laminate structure exposed along longitudinal direction | 1.39 |
| Comparative Example 9 | Posi. collector | Spriral/Laminate structure exposed along longitudinal direction | 1.39 |

| | Thickness T (mm) | Thickness of jacket (mm) | Composition of nonaqueous solvent |
|---|---|---|---|
| Example 23 | 2.9 | 0.1 | EC and MEC |
| Example 24 | 2.0 | 0.1 | EC and MEC |
| Example 25 | 4.0 | 0.1 | EC and MEC |
| Example 26 | 1.5 | 0.1 | EC and MEC |
| Example 27 | 2.9 | 0.1 | EC and MEC |
| Example 28 | 2.9 | 0.1 | EC and MEC |
| Example 29 | 2.9 | 0.2 | EC and MEC |
| Example 30 | 2.9 | 0.3 | EC and MEC |
| Example 31 | 2.9 | 0.5 | EC and MEC |
| Example 32 | 2.9 | 0.1 | EC and BL |
| Example 33 | 2.9 | 0.1 | EC and BL |
| Comparative Example 6 | 8.0 | 0.1 | EC and MEC |
| Comparative Example 7 | 2.9 | 0.1 | EC and MEC |
| Comparative Example 8 | 2.9 | 0.1 | EC and MEC |
| Comparative Example 9 | 2.9 | 0.6 | EC and MEC |

TABLE 3

| | Capacity retention ratio at 300th cycle (%) | Energy density per unit volume (Wh/L) | Battery temperature after storing in oven | Swelling ratio of jacket (%) |
|---|---|---|---|---|
| Example 23 | 85 | 310 | None | 4 |
| Example 24 | 83 | 300 | None | 3 |
| Example 25 | 86 | 315 | None | 4 |
| Example 26 | 80 | 290 | None | 2 |
| Example 27 | 85 | 310 | None | 4 |
| Example 28 | 85 | 310 | Increased up to 101° C. | 4 |
| Example 29 | 85 | 290 | None | 4 |
| Example 30 | 85 | 270 | Increased up to 102° C. | 5 |
| Example 31 | 85 | 250 | Increased up to 103° C. | 6 |
| Example 32 | 81 | 310 | None | 0 |
| Example 33 | 80 | 310 | None | 0 |
| Comparative Example 6 | 80 | 320 | Increased up to 115° C. | 8 |
| Comparative Example 7 | 84 | 310 | Increased up to 108° C. | 12 |

TABLE 3-continued

|  | Capacity retention ratio at 300th cycle (%) | Energy density per unit volume (Wh/L) | Battery temperature after storing in oven | Swelling ratio of jacket (%) |
|---|---|---|---|---|
| Comparative Example 8 | 83 | 310 | Increased up to 115° C. | 16 |
| Comparative Example 9 | 85 | 235 | Increased up to 108° C. | 18 |

As apparent from Tables 2 and 3, the secondary batteries obtained from Examples 23 to 33 wherein a surface having a maximum area of the electrode group was occupied by the positive electrode collector were higher in capacity retention ratio at the 300th cycle and were capable of inhibiting the rise in temperature as well as the generation of gas on the occasion when these batteries were left under a high-temperature environment. By contrast, although the capacity retention ratio at the 300th cycle were relatively high in the batteries of Comparative Examples 6 to 8, the degree of temperature rise as they were left under a high-temperature environment was larger as compared with the batteries of Examples 23 to 33, and furthermore, the quantity of gas generated as they were left under a high-temperature environment was also larger as compared with the batteries of Examples 23 to 33. On the other hand, the battery of Comparative Example 9 which was provided with a jacket having a thickness of more than 0.5 mm was found defective in that not only the energy density per unit volume was poor but also it was difficult to inhibit the rise in temperature as well as the generation of gas on the occasion when the battery was left under a high-temperature environment, even if the maximum area of the electrode group was allowed to be occupied by the positive electrode collector.

EXAMPLE 34

The positive electrode, negative electrode and separator which were similar to those explained in Example 23 were laminated one another in the order of the separator, the positive electrode, the separator and the negative electrode, and then, spirally wound with the outermost layer thereof being the separator to obtain a spiral body, which was then compressed in a direction of the diameter to form a flattened oblong electrode group as shown in FIG. 13.

A laminate film having a total thickness of 0.08 mm (80 $\mu$m) and composed of an aluminum foil, both surfaces thereof being covered by polypropylene film, was prepared. In this case, the polypropylene film formed on the inner surface of the aluminum foil and the surface contacted with the electrode group was designed to have a thickness of 0.015 mm (15 $\mu$m). Then, this laminate film was formed into a bag, in which the aforementioned electrode group was placed in such a manner that the laminated surface of the electrode group could be seen through an opening of the bag. On the other hand, polyacrylonitrile (PAN) was employed as an adhesive polymer and dissolved in an organic solvent of dimethyl formamide having a boiling point of 153° C. to obtain a 0.5 wt. % solution. The solution thus obtained was injected into the electrode group disposed inside the laminate film so as to make the amount thereof 0.25 mL per 100 mAh of battery capacity. Thus, the solution was allowed to penetrate inner region of the electrode group, and at the same time, to be attached to the entire surface of the electrode group.

Then, the electrode group disposed inside the laminate film was subjected to vacuum drying at a temperature of 80° C. for 12 hours, thereby allowing the organic solvent to evaporate and hence, allowing the adhesive polymer to be retained in voids of the positive electrode, negative electrode and separator so as to make the positive electrode, negative electrode and separator into an integral body, and at the same time, to form a porous adhesive portion on the surface of the electrode group. The total quantity of the PAN was 1.25 mg per 100 mAh of cell capacity.

Thereafter, the nonaqueous electrolyte of the same kind as explained in Example 23 was injected into the electrode group disposed inside the laminate film so as to make the amount thereof 4.1 g per 1 Ah of battery capacity. Thereafter, the bag was heat-sealed in an atmosphere of reduced pressure of not more than 30 Torr to thereby assemble a thin nonaqueous electrolyte secondary battery having a thickness of 3 mm, a width of 40 mm and a height of 70 mm.

EXAMPLE 35

The positive electrode, negative electrode and separator which were similar to those explained in Example 23 were laminated one another in the order of the separator, the positive electrode, the separator and the negative electrode, and then, spirally wound with the outermost layer thereof being the positive electrode collector to obtain a spiral body, which was then compressed in a direction of the diameter to form a flattened oblong electrode group as shown in FIG. 15.

The electrode group thus obtained was 2.5 mm in thickness T, 63 mm in length $L_1$ in the longitudinal direction thereof, 36 mm in length $L_2$ perpendicular to the longitudinal direction thereof.

A polyimide tape having a width of 40 mm and a thickness of 0.15 mm was prepared as an insulating protective sheet. Then, the outermost periphery of the electrode group was covered by making use of this protective sheet in such a manner that the both ends of the protective sheet were contacted with each other, and hence, the distance X between the both ends of the protective sheet became zero.

A laminate film having a thickness of 0.1 mm (100 $\mu$m) and composed of an aluminum foil, both surfaces thereof being covered by polypropylene film, was prepared. Then, this laminate film was formed into a bag, in which the aforementioned electrode group was placed.

Thereafter, a press working was applied to the resultant body in the direction of the thickness thereof at a pressure of 15 kg/cm$^2$ and in a vacuum atmosphere at a temperature of 90° C., thereby making the positive electrode, negative electrode and separator into an integral body.

On the other hand, a nonaqueous electrolyte was prepared by dissolving lithium borofluoride (LiBF$_4$) in a mixed solvent composed of ethylene carbonate (EC) and γ-butyrolactone (BL) mixed at a volume ratio of 25:75 in an amount of 1.5 mol./L to prepare.

Thereafter, a nonaqueous electrolyte was injected into the electrode group disposed inside the laminate film so as to make the amount thereof 4.1 g per 1 Ah of battery capacity. Thereafter, the bag was heat-sealed in an atmosphere of reduced pressure of not more than 30 Torr to thereby assemble a thin nonaqueous electrolyte secondary battery having a thickness of 3 mm, a width of 40 mm and a height of 70 mm.

EXAMPLES 36 to 37

A thin nonaqueous electrolyte secondary battery was manufactured in the same manner as explained in Example 35 except that the thickness of the insulating protective sheet was altered as shown in the following Table 4.

EXAMPLE 38

The outermost periphery of an electrode group of the same kind as explained in Example 35 was covered by making use of a protective sheet of the same kind as explained in Example 35 in such a manner that the both ends of the protective sheet were spaced apart from each other. Namely, the distance X between the both ends of the protective sheet was 7 mm, i.e. $0.20 \times L_2$.

Then, a thin nonaqueous electrolyte secondary battery was assembled in the same manner as explained in Example 35 through the processes including the placement of an electrode group inside a laminate film, the press molding, the injection of a liquid nonaqueous electrolyte, and the heat-sealing.

EXAMPLE 39

A thin nonaqueous electrolyte secondary battery was manufactured in the same manner as explained in Example 38 except that the distance X between the both ends of the protective sheet was set to 14 mm, i.e. $0.40 \times L_2$.

EXAMPLE 40

The outermost periphery of a flattened electrode group of the same kind as explained in Example 35 was covered by making use of a protective sheet of the same kind as explained in Example 35 in such a manner that the both ends of the protective sheet were overlapped by a distance of 10 mm with each other.

Then, a thin nonaqueous electrolyte secondary battery was assembled in the same manner as explained in Example 35 through the processes including the placement of an electrode group inside a laminate film, the press molding, the injection of a liquid nonaqueous electrolyte, and heat-sealing.

EXAMPLE 41

A flattened electrode group of the same kind as explained in Example 35 was covered by making use of a protective sheet in the same manner as explained in Example 35.

A laminate film having a thickness of 0.2 mm and composed of an aluminum foil, both surfaces thereof being covered by polypropylene film, was prepared. Then, this laminate film was formed into a bag, in which the aforementioned electrode group was placed.

Thereafter, a solution of an adhesive polymer was injected into the electrode group and vacuum-dried in the same manner as explained in Example 34. Thereafter, a liquid nonaqueous electrolyte of the same kind as explained in Example 35 was injected into the bag, which was then heat-sealed in an atmosphere of reduced pressure of not more than 30 Torr to thereby assemble a thin nonaqueous electrolyte secondary battery having a thickness of 3 mm, a width of 40 mm and a height of 70 mm.

EXAMPLES 42 and 43

A thin nonaqueous electrolyte secondary battery was manufactured in the same manner as explained in Example 41 except that the thickness of the jacket was altered as shown in the following Table 4.

EXAMPLE 44

A polypropylene tape having a width of 40 mm and a thickness of 0.2 mm was prepared as an insulating protective sheet. Then, the outermost periphery of the flattened electrode group of the same kind as explained in Example 35 was covered by making use of this protective sheet in such a manner that the both ends of the protective sheet were contacted with each other, and hence, the distance X between the both ends of the protective sheet became zero.

A laminate film having a thickness of 0.1 mm and composed of an aluminum foil, both surfaces thereof being covered by polypropylene film, was prepared. Then, this laminate film was formed into a bag, in which the aforementioned electrode group was placed.

Thereafter, a solution of an adhesive polymer was injected into the electrode group and vacuum-dried in the same manner as explained in Example 34. Thereafter, a liquid nonaqueous electrolyte of the same kind as explained in Example 35 was injected into the bag, which was then heat-sealed in an atmosphere of reduced pressure of not more than 30 Torr to thereby assemble a thin nonaqueous electrolyte secondary battery having a thickness of 3 mm, a width of 40 mm and a height of 70 mm.

EXAMPLE 45

A thin nonaqueous electrolyte secondary battery was manufactured in the same manner as explained in Example 44 except that the material for the protective sheet was changed to polyethylene resin.

Comparative Example 10

A thin nonaqueous electrolyte secondary battery was assembled in the same manner as explained in Example 34 except that the outermost layer of electrode group was a negative electrode collector.

Comparative Example 11

A thin nonaqueous electrolyte secondary battery was assembled in the same manner as explained in Example 34 except that the outermost layer of electrode group was a negative electrode collector, and at the same time, the thickness of the jacket was set to 0.7 mm.

Each of the secondary batteries obtained from Examples 34 to 45 and Comparative Examples 10 and 11 was subjected to a charge/discharge cycle, wherein the secondary battery was charged for 5 hours with a charging current of 0.5 C up to a voltage of 4.2V and then, discharged with a current of 0.5 C until the voltage thereof was lowered down to 2.7V to determine the discharge capacity at the 300th cycle in relative to the discharge capacity of the first cycle which was defined as being 100%. The discharge capacity thus determined was defined as the capacity retention ratio at the 300th cycle, the results being shown in the following Table 4.

20 samples of each of the secondary batteries obtained from Examples 34 to 45 and Comparative Examples 10 and 11 were prepared. After these samples were charged up to a voltage of 4.2V, these samples were subjected to a drop test in which these samples were dropped five times from a height of 180 cm. Thereafter, the number of battery samples indicating any abnormality in the property thereof was measured, the results being shown in the following Table 4.

Furthermore, the energy density per unit volume in each of the secondary batteries of Examples 34 to 45 and Comparative Examples 10 and 11 was measured, the results being shown in the following Table 4.

were a large number of secondary batteries which indicated any abnormality in the performance thereof due to the drop test even though the capacity retention ratio thereof at the 300th cycle was relatively high. On the other hand, in the case of the secondary battery of Comparative Example 11 which was provided with an electrode group whose outermost periphery was the negative electrode collector and with a jacket having a thickness of 0.7 mm, the energy density per unit volume would be inevitably deteriorated, even though the capacity retention factor thereof at the 300th cycle was relatively high, and the number of secondary batteries which

TABLE 4

|  | Surface of Max. area | Material for protective sheet | Thickness of protective sheet (mm) | Distance X |
|---|---|---|---|---|
| Example 34 | Separator | None | — | — |
| Example 35 | Posi. collector | Polyimide resin | 0.15 | 0 |
| Example 36 | Posi. collector | Polyimide resin | 0.1 | 0 |
| Example 37 | Posi. collector | Polyimide resin | 0.3 | 0 |
| Example 38 | Posi. collector | Polyimide resin | 0.15 | $0.2 \times L_2$ |
| Example 39 | Posi. collector | Polyimide resin | 0.15 | $0.4 \times L_2$ |
| Example 40 | Posi. collector | Polyimide resin | 0.15 | Overlapped |
| Example 41 | Posi. collector | Polyimide resin | 0.15 | 0 |
| Example 42 | Posi. collector | Polyimide resin | 0.15 | 0 |
| Example 43 | Posi. collector | Polyimide resin | 0.15 | 0 |
| Example 44 | Posi. collector | Polypropylene resin | 0.15 | 0 |
| Example 45 | Posi. collector | Polyethylene resin | 0.15 | 0 |
| Comparative Example 10 | Nega. Collector | None | — | — |
| Comparative Example 11 | Nega. Collector | None | — | — |

|  | Thickness of jacket (mm) | Capacity retention ratio at 300th cycle (%) | Number of abnormal samples | Energy density per unit volume (Wh/L) |
|---|---|---|---|---|
| Example 34 | 0.08 | 83 | 0 | 305 |
| Example 35 | 0.1 | 80 | 0 | 275 |
| Example 36 | 0.1 | 80 | 0 | 290 |
| Example 37 | 0.1 | 78 | 0 | 245 |
| Example 38 | 0.1 | 80 | 0 | 275 |
| Example 39 | 0.1 | 80 | 1 | 275 |
| Example 40 | 0.1 | 73 | 0 | 270 |
| Example 41 | 0.2 | 80 | 0 | 255 |
| Example 42 | 0.3 | 80 | 0 | 230 |
| Example 43 | 0.5 | 80 | 0 | 190 |
| Example 44 | 0.1 | 83 | 0 | 275 |
| Example 45 | 0.1 | 83 | 0 | 275 |
| Comparative Example 10 | 0.08 | 83 | 8 | 315 |
| Comparative Example 11 | 0.7 | 83 | 0 | 175 |

As apparent from Table 4, the secondary battery of Example 34 which includes an electrode group wherein a couple of surfaces each having a maximum area of the electrode group were occupied by the separator was higher in capacity retention ratio at the 300th cycle, and furthermore, the number of battery samples indicating any abnormality in the property thereof in the above drop test was found zero in the case of the secondary battery of Example 34. Further, in the case of the secondary batteries of Examples 34 to 45 which include an electrode group wherein the protective sheet was disposed to bridge a couple of surfaces of maximum area, it was found possible to enhance the capacity retention ratio thereof at the 300th cycle, and to minimize the number of battery samples indicating any abnormality in the property thereof in the above drop test.

Whereas, in the case of the secondary battery of Comparative Example 10 wherein the outermost periphery of the electrode group was the negative electrode collector, there indicated any abnormality in the performance thereof due to the drop test was found zero.

As explained above, it is possible, according to this invention, to improve the charge/discharge cycle life of a secondary battery which comprises a light-weight and thin jacket. Further, it is also possible, according to this invention, to provide a secondary battery which is excellent in thermal stability, and capable of suppressing abnormal heating and of improving the safety of the battery. Furthermore, it is also possible, according to this invention, to minimize a damage due to a shock such as dropping and to inhibit the short-circuit of the battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secondary battery comprising:

an electrode group comprising a positive electrode, a negative electrode and a separator, said positive electrode comprising a positive electrode collector and a positive electrode layer held to said positive electrode collector, said negative electrode comprising a negative electrode collector and a negative electrode layer held to said negative electrode collector, and said separator interposed between said positive electrode layer and said negative electrode layer;

a nonaqueous electrolyte held by said electrode group; and a jacket housing said electrode group and having a thickness of not more than 0.3 mm;

wherein said positive electrode, said negative electrode and said separator are formed integrally, and the peeling strength between said positive electrode layer and said separator is lower than the peeling strength between said positive electrode layer and said positive electrode collector, while the peeling strength between said negative electrode layer and said separator is lower than the peeling strength between said negative electrode layer and said negative electrode collector; and wherein the peeling strength between said negative electrode layer and said separator is 0.01 gf/cm or more and 5 gf/cm or less, and the peeling strength between said positive electrode layer and said separator is 0.1 gf/cm or more and 5 gf/cm or less.

2. The secondary battery according to claim 1, wherein said negative electrode layer contains at least one kind of a carbon material selected from the group consisting of a fibrous carbon material, a spherical carbon material, and a granular carbon material.

3. The secondary battery according to claim 1, wherein said separator has an air permeability of not more then 500 sec./100 cm$^3$.

4. The secondary battery according to claim 1, wherein said nonaqueous electrolyte is in at least one of liquid and gel form.

5. The secondary battery according to claim 1, wherein said nonaqueous electrolyte contains a solution prepared by dissolving a solute in a nonaqueous solvent, said solution having a viscosity of 3 cp or more at a temperature of 20° C.

6. The secondary battery according to claim 5, wherein said nonaqueous solvent contains an ethylene carbonate (EC) and at least one kind of a first solvent selected from the group consisting of propylene carbonate (PC), diethyl carbonate (DEC) and γ-butyrolactone (BL).

7. The secondary battery according to claim 6, wherein a ratio of said first solvent in said nonaqueous solvent is in a range of 50 to 90% by volume.

8. The secondary battery according to claim 5, wherein the viscosity of said solution is in a range of 4 cp to 15 cp.

9. The secondary battery according to claim 1, wherein the peeling strength between said negative electrode layer and said negative electrode collector is within a range of 10–20 gf/cm.

10. The secondary battery according to claim 1, wherein the peeling strength between said positive electrode layer and said positive electrode collector is within a range of 10–20 gf/cm.

11. The secondary battery according to claim 1, wherein said jacket is made of a sheet including at least one of resin and metal.

12. The secondary battery according to claim 11, wherein said sheet includes a metal layer and a protective layer, that is formed on at least one side of said metal layer and includes resin.

13. The secondary battery according to claim 1, wherein said positive electrode, electrode, negative electrode and separator are integrated with each other by an adhesive polymer.

14. The secondary battery according to claim 1, wherein said positive electrode and negative electrode respectively contains a binder, and said positive electrode, negative electrode and separator are integrated with each other by thermally curing said binder.

15. The secondary battery according to claim 1, wherein said jacket has a thickness of not more then 0.25 mm.

16. The secondary battery according to claim 1, wherein the peeling strength between said negative electrode layer and said separator is a range from 0.01 gf/cm to 2 gf/cm.

17. The secondary battery according to claim 1, wherein the peeling strength between said positive electrode layer and said separator is a range from 0.1 gf/cm to 2 gf/cm.

18. A secondary battery comprising:

an electrode group comprising a positive electrode, a negative electrode and a separator, said positive electrode comprising a positive electrode collector and a positive electrode layer held to said positive electrode collector, said negative electrode comprising a negative electrode collector and a negative electrode layer held to said negative electrode collector, and said separator interposed between said positive electrode layer and said negative electrode layer;

a nonaqueous electrolyte held by said electrode group; and a jacket housing said electrode group, said jacket being made of a sheet having a thickness of not more than 0.5 mm and said sheet including a resin layer, wherein said positive electrode, said negative electrode and said separator are formed integrally, and the peeling strength between said positive electrode layer and said separator is lower than the peeling strength between said positive electrode layer and said positive electrode collector, while the peeling strength between said negative electrode layer and said separator is lower than the peeling strength between said negative electrode layer and said negative electrode collector, and the peeling strength between said negative electrode layer and said separator is 0.01 gf/cm or more and 5 gf/cm or less, and the peeling strength between said positive electrode layer and said separator is 0.1 gf/cm or more and 5 gf/cm or less.

19. The secondary battery according to claim 18, wherein said nonaqueous electrolyte is in at least one of liquid and gel form.

20. The secondary battery according to claim 18, wherein said nonaqueous electrolyte contains a solution prepared by dissolving a solute in a nonaqueous solvent, said solution having a viscosity of 3 cp or more at a temperature of 20° C.

21. The secondary battery according to claim 18, wherein the peeling strength between said negative electrode layer and said negative electrode collector is within a range of 10–20 gf/cm.

22. The secondary battery according to claim 18, wherein the peeling strength between said positive electrode layer and said positive electrode collector is within a range of 10–20 gf/cm.

23. The secondary battery according to claim 18, wherein said positive electrode, negative electrode and separator are integrated with each other by an adhesive polymer.

24. The secondary battery according to claim 18, wherein said positive electrode and negative electrode respectively contains a binder, and said positive electrode, negative electrode and separator are integrated with each other by thermally curing said binder.

25. The secondary battery according to claim 18, wherein the peeling strength between said negative electrode layer and said separator is a range from 0.01 gf/cm to 2 gf/cm.

26. The secondary battery according to claim 18, wherein the peeling strength between said positive electrode layer and said separator is a range from 0.1 gf/cm to 2 gf/cm.

27. A secondary battery comprising:

an electrode group having a flatly-wound shape, said electrode group comprising a positive electrode that comprises a positive electrode collector and a positive electrode layer held to said positive electrode collector, a negative electrode, and a separator that is interposed between said positive electrode and said negative electrode;

a nonaqueous electrolyte provided in said electrode group; and a jacket housing said electrode group and having a thickness of not more than 0.3 mm, wherein an outermost layer of said electrode group is said positive electrode collector.

28. The secondary battery according to claim 27, wherein the thickness of said electrode group is not more than 4 mm, and the ratio of the longitudinal length to the breadth of said electrode group as calculated by the following formula (1) is 1.2 or more;

$$L_1/L_2 \quad (1)$$

wherein $L_1$ is the length in the longitudinal direction of the electrode group, and $L_2$ is the length perpendicular to the longitudinal direction of the electrode group.

29. The secondary battery according to claim 27, wherein a laminate structure constituted by said positive electrode, negative electrode and separator is exposed at the end face in the longitudinal direction of said electrode group.

30. A secondary battery comprising:

an electrode group having a flatly-wound shape, said electrode group comprising a positive electrode that comprises a positive electrode collector and a positive electrode layer held to said positive electrode collector, a negative electrode, and a separator that is interposed between said positive electrode and said negative electrode;

a nonaqueous electrolyte provided in said electrode group; and a jacket housing said electrode group, said jacket being made of a sheet having a thickness of not more than 0.5 mm and said sheet including a resin layer, wherein an outermost layer of said electrode group is said positive electrode collector.

31. The secondary battery according to claim 30, wherein an insulating protective sheet is disposed to bridge two surfaces of an outermost periphery of said electrode group respectively having maximum areas, and areas of said respective surfaces having maximum areas are determined based on a product of a length in the longitudinal direction of the electrode group and a length in a direction perpendicular to the longitudinal direction of the electrode group.

32. The secondary battery according to claim 30, wherein a ratio of the longitudinal length to a breadth of said electrode group as calculated by the formula $L_1/L_2$ is 1.2 to 5, wherein $L_1$ is the length in the longitudinal direction of the electrode group, and $L_2$ is the length perpendicular to the longitudinal direction of the electrode group.

33. The secondary battery according to claim 30, wherein said resin layer forms an inner surface of said jacket.

34. The secondary battery according to claim 30, wherein said sheet comprises a metal layer and a protective layer, which includes said resin layer and is laminated on said metal layer.

35. A secondary battery comprising;

an electrode group of flattened configuration which comprises a positive electrode, a negative electrode, and a separator interposed between said positive electrode and said negative electrode;

a liquid nonaqueous electrolyte impregnated in said electrode group; and a jacket housing said electrode group and having a thickness of not more than 0.3 mm, wherein said electrode group has a couple of maximum areas, each area is occupied by said separator.

36. A secondary battery comprising;

an electrode group of flattened configuration which comprises a positive electrode, a negative electrode, and a separator interposed between said positive electrode and said negative electrode;

a liquid nonaqueous electrolyte impregnated in said electrode group; and a jacket housing said electrode group, said jacket being made of a sheet having a thickness of not more than 0.5 mm and including a resin layer, wherein said electrode group has a couple of maximum areas, each area is occupied by said separator.

37. A secondary battery comprising:

an electrode group of flattened configuration that comprises a positive electrode, a negative electrode, and a separator interposed between said positive electrode and said negative electrode;

a nonaqueous electrolyte provided in said electrode group; and a jacket housing said electrode group and having a thickness of not more than 0.3 mm, wherein said electrode group has a couple of surfaces having a maximum area, said maximum area is determined based on a product of the length in the longitudinal direction of the electrode group and the length in the direction perpendicular to the longitudinal direction of the electrode group, and an insulating protective sheet is disposed to bridge said couple of surfaces having the maximum area.

38. The secondary battery according to claim 37, wherein said insulating protective sheet has a thickness of 0.05 mm to 0.5 mm.

39. The secondary battery according to claim 37, wherein said insulating protective sheet is disposed to bridge said couple of maximum areas, and the opposite ends of said insulating protective sheet are contacted with or spaced away from each other, a distance X between the opposite ends which satisfy the following formula (2);

$$0 \leq X \leq 0.4 \times L_3 \quad (2)$$

wherein $L_3$ is a length as measured along the revolving direction of the insulating protective sheet among the length in the longitudinal direction of the electrode group and the length in the direction perpendicular to the longitudinal direction of the electrode group.

40. A secondary battery comprising:

an electrode group of flattened configuration that comprises a positive electrode, a negative electrode, and a separator interposed between said positive electrode and said negative electrode;

a nonaqueous electrolyte provided in said electrode group; and a jacket housing said electrode group, said jacket being made of a sheet having a thickness of not more than 0.5 mm and said jacket including a resin layer, wherein said electrode group has a couple of surfaces having a maximum area, said maximum area is determined based on a product of the length in the longitudinal direction of the electrode group and the length in the direction perpendicular to the longitudinal direction of the electrode group, and an insulating protective sheet is disposed to bridge said couple of surfaces having the maximum area.

* * * * *